United States Patent
Brady et al.

(10) Patent No.: US 7,315,640 B1
(45) Date of Patent: Jan. 1, 2008

(54) X-RAY IMAGE PROCESSING

(75) Inventors: John Michael Brady, Oxford (GB); Ralph Highnam, Oxford (GB)

(73) Assignee: Mirada Solutions Limited, Oxfordshite (GB)

( * ) Notice: Subject to any disclaimer, the term of this patent is extended or adjusted under 35 U.S.C. 154(b) by 0 days.

(21) Appl. No.: 09/914,460

(22) PCT Filed: Feb. 21, 2000

(86) PCT No.: PCT/GB00/00617

§ 371 (c)(1), (2), (4) Date: Oct. 11, 2001

(87) PCT Pub. No.: WO00/52641

PCT Pub. Date: Sep. 8, 2000

(30) Foreign Application Priority Data

Mar. 1, 1999 (GB) ............ 9904692.2

(51) Int. Cl.
*G06K 9/00* (2006.01)

(52) U.S. Cl. ............ 382/132; 382/128

(58) Field of Classification Search ........ 382/128, 382/130, 131, 132, 169; 378/98.4, 207
See application file for complete search history.

(56) References Cited

U.S. PATENT DOCUMENTS

| | | | |
|---|---|---|---|
| 4,762,343 A | 8/1988 | Hirohata | 285/140.1 |
| 4,907,288 A | 3/1990 | Shimoni | 382/130 |
| 5,166,969 A | 11/1992 | Heidsieck | 378/207 |
| 5,553,111 A | 9/1996 | Moore et al. | 378/37 |
| 5,574,799 A | 11/1996 | Bankman et al. | 382/132 |
| 5,633,951 A | 5/1997 | Moshfeghi | 382/154 |
| 5,710,841 A * | 1/1998 | Green et al. | 382/274 |
| 5,757,880 A | 5/1998 | Colomb | 378/37 |
| 5,760,403 A | 6/1998 | Elabd | 250/370.11 |
| 5,960,058 A | 9/1999 | Baba et al. | 378/98.4 |
| 6,611,615 B1 | 8/2003 | Christensen | 382/130 |
| 6,738,499 B1 | 5/2004 | Doi et al. | 382/128 |
| 6,757,423 B1 | 6/2004 | Amini | 382/154 |

FOREIGN PATENT DOCUMENTS

| | | |
|---|---|---|
| EP | 0 196 044 | 10/1988 |
| EP | 0 532 823 | 3/1993 |
| EP | 0 788 070 | 8/1997 |

OTHER PUBLICATIONS

Highnam et al. ("Computing the Scatter Component of Mammographic Images", IEEE Transactions on Medical Imaging, vol. 13, No. 2, Jun. 1994, pp. 301-313).*

(Continued)

*Primary Examiner*—Duy M. Dang
(74) *Attorney, Agent, or Firm*—Nixon & Vanderhye, PC

(57) ABSTRACT

A method of enhancing and normalizing x-ray images, particularly mammograms, by correcting the image for digitizer blur, glare from the intensifying screen and the anode-heel effect. The method also allows the calculation of the compressed thickness of the imaged breast and calculation of the contribution to the mammograms of the extra focal radiation. The correction of the image for glare from the intensifying screen allows the detection of noise, such as film shot noise, in the image, and in particular the differentiation between such noise and microcalcifications.

24 Claims, 17 Drawing Sheets

OTHER PUBLICATIONS

Moody E.B.: "Discrete Orthogonal Polynomial Restoration of Images Degraded by Spatially Varying Point Spread Functions", Proceedings of the International Conference on Image Processing (ICIP), US, Los Alamitos, IEEE Comp. Soc. Press, pp. 680-684, 1994.

Mitsuo Ohta et al,: "A Restoration and Method of Medical X-Ray Images Based on an Extended Regression Analysis Method", Systems & Computers in Japan, US, Scripta Technia Journals. New York, vol. 22, No. 13, Jan. 1, 1991, pp. 104-116.

J. A. Seibert et al: "Removal of Image Intensifier Veiling Glare by Mathematical Deconvolution Techniques", Journal of Medical Physics, vol. 13, No. 3, May/Jun. 1985.

Rangaraj M. Rangayyan et al; "Parabolic Modelling and Classification of Breast Tumors", Intl. Journal of Shape Modelling, vol. 3, No. 3-4, Sep-Dec. 1997, pp. 155-156.

* cited by examiner

Example of glare removal

Original Energy Image | Glare-Removed Energy Image

Noise Detection

Phantom image          Detected noise

Noise Detection : Real Image

Real image          Detected noise

Noise Detection : Real Image

Real image          Detected noise

Detecting low-contrast microcalcifications (a)          (b)          (c)

Detection of false positives (a)          (b)          (c)

Examples of the projected breast edge

Change in the breast edge with $H$ 3.4cm      5.4cm      6.0cm      6.4cm

Fig.20.

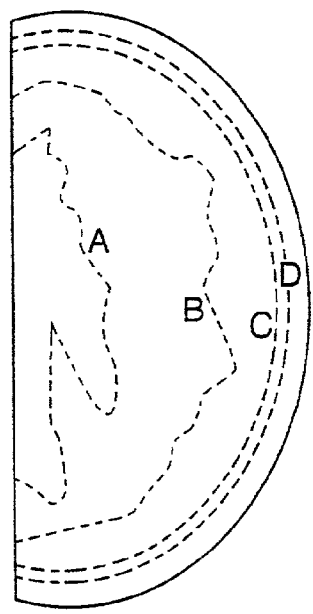
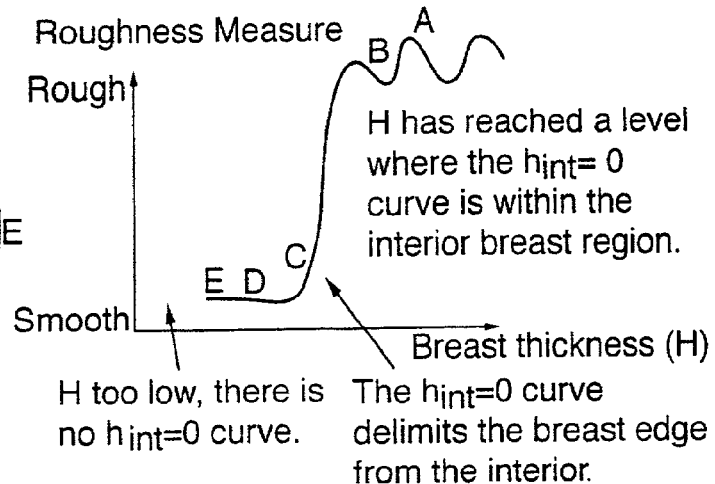

H has reached a level where the $h_{int}= 0$ curve is within the interior breast region.

H too low, there is no $h_{int}=0$ curve.

The $h_{int}=0$ curve delimits the breast edge from the interior.

Fig.21.

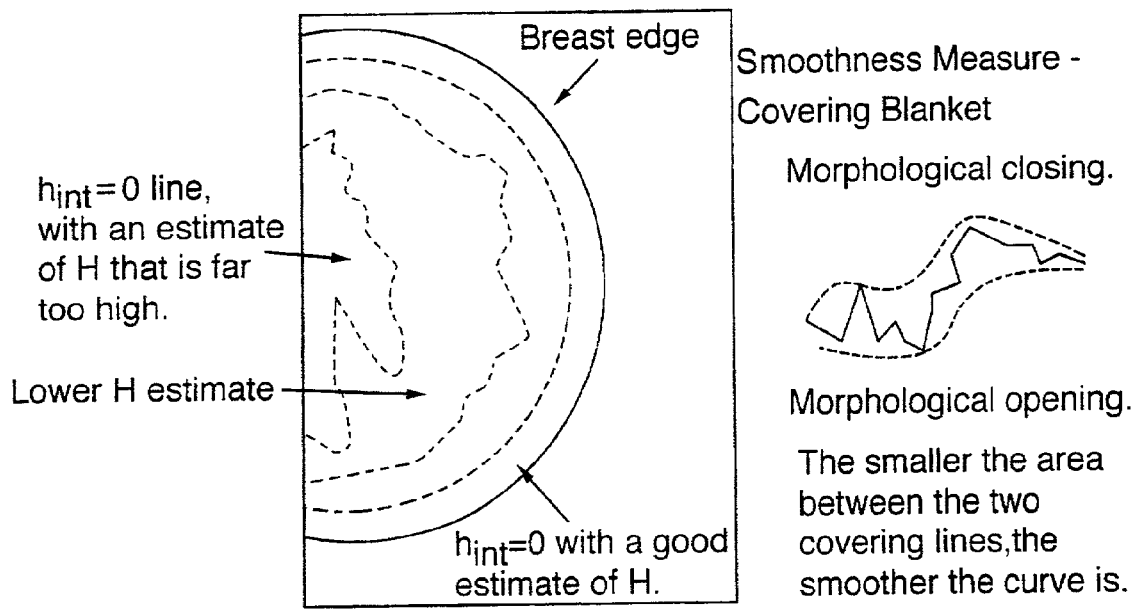

Breast edge $h_{int}=0$ line, with an estimate of H that is far too high.

Lower H estimate $h_{int}=0$ with a good estimate of H.

Smoothness Measure - Covering Blanket

Morphological closing.

Morphological opening.

The smaller the area between the two covering lines, the smoother the curve is.

Fig.22.

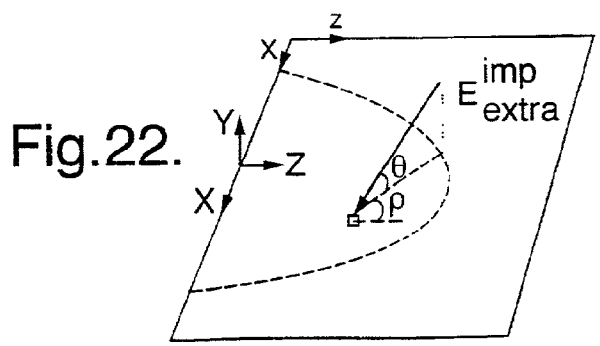

Fig.24.
Examples of extra-focal radiation
Original image   Energy imparted   Extra-focal component
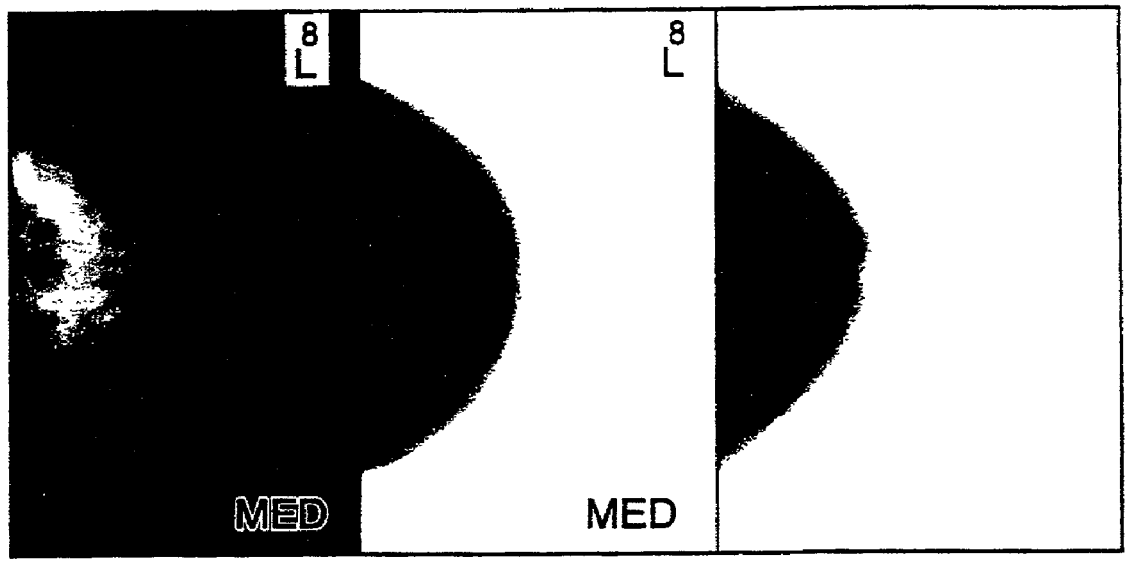
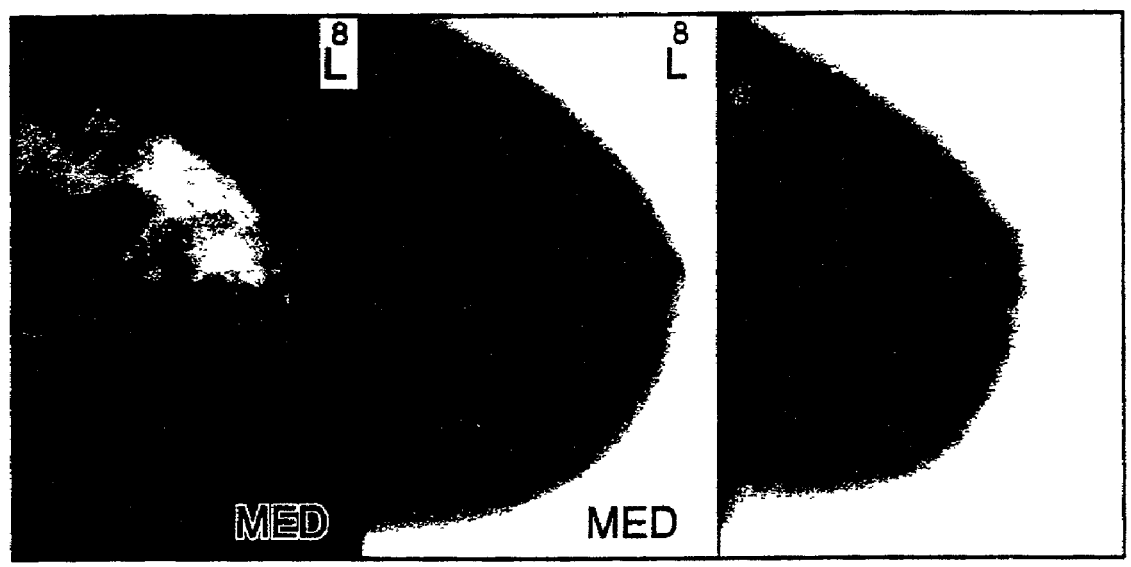

X-RAY IMAGE PROCESSING

CROSS-REFERENCE TO RELATED APPLICATION

This application is the national stage of international application no. PCT/GB00/00617, filed Feb. 21, 2000, which designates the United States and which claims priority from GB 9904692.2, filed Mar. 1, 1999.

BACKGROUND

The present invention relates to improvements in the processing of digitised x-ray images (particularly of the breast—termed mammograms or mammographic images), and more particularly to the enhancement of such images to assist clinicians in making accurate diagnoses based on them.

X-ray imaging is used as a basis for many medical techniques and, in particular, mammography continues to be the examination of choice for early detection of breast cancer in post-menopausal women and is the basis for national screening programmes.

Early detection of breast cancer greatly improves mortality rates, perhaps by as much as 25%. For this reason, mammographic examinations are nowadays performed on about 25 million women annually in the EC (of which, about 3 million are in the UK), at a cost of about 3 Bn US dollars per year. This huge cost and the poor accuracy in diagnosis (8-25% of cancers are missed and 70-80% of open surgical biopsies turn out to be benign), have led to increased interest in applying computer-aided techniques. Further, pressure for a reduction in the screening interval and for routine adoption of two-view screening (cranio-caudal and 45 degree mediolateral) would entail a large increase in the number of mammograms to be analysed in the screening programme and this makes the development of reliable and robust computer techniques vital.

As an application of image processing, mammographic images pose a tough challenge because they have poor signal-to-noise ratio. This is largely because the images exhibit complex textures, and because there is a compromise between radiation dose and image quality. Worse, abnormalities appear as quite subtle, irregular, often non-local differences in intensity and the images are inevitably cluttered due to superimposition in the image of features separated in the breast. Further, the background varies greatly between different breasts, and there is relatively weak control of the imaging acquisition.

Unfortunately, while there have been proposals for the application of image processing to mammography, the vast majority have been of limited scope and incorporate only general non-mammography-specific image processing considerations. This involves great dangers. Image smoothing using such standard techniques may make lesions easier to locate, but can remove calcifications and spiculations which can be signs of cancer. Edge sharpening using standard techniques may appear to improve an image, but malignant lesions typically have fuzzy edges whereas benign ones tend to have sharp edges, so this edge sharpening process can actually transform an image of a malignant lesion into one that appears to a radiologist to be benign.

Calcifications present particular interest and problems. Localised cancers in the ducts or lobules of the breast are often are associated with secretions that thicken or become necrotic. These are called calcifications, or microcalcifications if they are smaller. Clusters of microcalcifications, which appear as small bright white objects in a mammogram, can be one of the earliest signs of breast cancer. Thus the identification of calcifications is a major goal of screening programmes, though benign calcifications are common (for example they often occur in blood vessels), and so the distinction between ductal and vascular microcalcifications needs to be made if the number of false positives is to be sufficiently low. This is not a problem for radiologists interpreting mammograms against the background of their knowledge of breast anatomy. It is, however, a challenge for image analysis programs. Further, dust and dirt entering the imaging system can create artifacts that mimic the appearance of microcalcifications and thus can be a cause of false positives both for radiologists and automated imaging systems.

Further problems are caused because the imaging process itself introduces a number of variables which affect the image and these will be explained below.

In the accompanying drawings FIG. 1 shows a schematic representation of the components of a conventional screen-film mammographic system. When a mammogram is performed, a beam of x-ray photons 1 from an x-ray tube 2 powered by a generator 4 is directed towards a breast 3 compressed between compression plates 17. This beam 3 is filtered by filter 5 to remove low energy photons and collimated by collimator 7 to the area of interest. The beam has a spectrum of energies that is characteristic of the tube voltage and, in particular, the material of the anode 9 but the spectrum is independent of the woman being scanned and the view taken. The intensity of the beam exiting the breast is related to the thickness and type of tissue in the breast. The x-ray photons leaving the breast normally have to pass through an anti-scatter grid 11 before they reach a phosphorous intensifying screen 13. If an x-ray photon is absorbed in the screen 13, light photons are emitted by the phosphor and these light photons expose a film 15 which is processed to produce a mammogram. The exposure to the breast is stopped once an automatic exposure control 19, positioned under a section of the breast, has received a set exposure. To generate a digital image the x-ray film is typically digitised using a laser scanner system or CCD and light box (not illustrated).

The intensity of radiation incident on the breast in such a system varies spatially for several reasons. The most significant is the "anode heel effect". An x-ray tube produces x-rays by firing an electron beam at an anode. As the electron beam penetrates the anode the electrons are absorbed at varying depths and the x-ray photons that are produced have to travel through varying thicknesses of anode material before leaving the anode. This leads to varying attenuation of the emergent x-ray beam thus giving spatial variations in the incident x-ray spectrum, this is termed the anode heel effect and is quite substantial. Another source of spatial variation is due to the diverging nature of the beam. This means that the further away from the source the more spread out the x-ray beam is. However, this effect is small given that the distance from the source to the breast is large relative to the breast size. In visual assessment of mammograms the clinician mostly considers local variations in intensity, so the smooth change caused by the anode heel effect is not too troublesome. However, it does cause a problem for automated systems.

Two further effects of the image forming process which affect the image are scatter and extra-focal radiation. Considering scatter first, the x-ray radiation passes through the breast as shown in FIG. 2 and what is known as the primary beam passes through in a straight line from the anode to the intensifying screen. However, some x-ray photons are scattered in the breast and arrive at the screen from unexpected directions. The anti-scatter grid, which typically consists of a series of angled lead strips 21 separated by paper and aligned with the primary beam, removes many but not all of these scattered photons. Thus some scatter will reach the screen and be recorded on the film. Scatter can be estimated using the techniques described in "Computing the scatter component of mammographic images", by Ralph Highnam, Michael Brady and Basil Shepstone published in IEEE Med. Imaging, 1994, 13, pp 301-313. This allows the calculation of the primary energy imparted to the screen to be improved by the subtraction of the energy due to scatter. Extra-focal radiation refers to radiation which comes around the edge of the collimator 7 as shown by numeral 1A in FIG. 3, and can constitute up to 15% of the total, some of which is scattered and reaches the film/screen. Simple techniques for measuring the extra-focal radiation are known, for instance from the paper by Highnam, Brady and Shepstone mentioned above.

The processes of intensification by the intensifying screen introduces blur or glare into the recorded image because the absorption of an x-ray photon at a point site 13A in the screen results in the approximately isotropic emission of light as shown in FIG. 4 which results in blurring of the image recorded on the film.

Further, the relationship between the density of the image on the film and the energy imparted to the intensifying screen is not linear and changes with film processing conditions. Again, this may not affect visual assessment which is based on local variations, but would affect automated analysis, especially if the non linearity were not explicitly taken into account.

Finally, the process of digitizing the film introduces digitizer blur into the digital representation of the image.

It will be appreciated, therefore that the enhancement of x-ray mammograms and automated recognition and differentiation of features in mammograms is a very difficult problem.

It has been proposed that the conversion of a digitised mammogram into a particular representation, termed the $h_{int}$ representation, is capable of improving the enhancement and analysis of such mammograms. This was described in "A representation for mammographic image processing" by Ralph Highnam, Michael Brady and Basil Shepstone published in Medical Image Analysis; 1996, vol. 1, no. 1, pp 1-18 and, since the present invention is concerned with improvements to it, will be briefly explained below.

The intensity of a mammogram at a given pixel (x, y) indicates the amount of attenuation (absorption and scattering) of x-rays in the pencil of breast tissue vertically above (x, y) on the film.

Ideally, one might hope to be able to produce a quantitative three-dimensional representation of the breast with each voxel labelled with a tissue type, such as: glandular, fibrous, cancerous, fat, calcium. Given the x-ray attenuation within a voxel it is certainly possible to classify fat since it has relatively low linear attenuation coefficients. It is also possible to classify likely occurrence of calcium, which is practically radio-opaque. However, the remaining breast tissues are those that comprise anatomically significant events in breast disease, such as cysts, malignant masses, fibroadenomas, and they are difficult to resolve from x-ray attenuation measurements alone. In the $h_{int}$ representation these remaining tissues are classified as "interesting tissue". Further, there is actually very little calcium so for practical purposes it can be ignored.

Unfortunately, a further problem arises because of the projective nature of mammographic imaging: the three-dimensional information is lost. In light of this, the only information that is available describes the tissue within a cone of the breast, where the cone has as its base the area of a pixel and as its apex the x-ray source. After appropriate correction the x-ray beam within this cone can be considered as a pencil beam. Thus in the $h_{int}$ representation (with calcium ignored) there are basically only two tissue classes of fat and interesting tissue to consider, and the thicknesses of the interesting tissue ($h_{int}$ cm) and fat ($h_{fat}$ cm) which together must necessarily add up to the total breast thickness H (i.e. $H = h_{int} + h_{fat}$) are used as quantitative breast measurements.

In practice $h_{int}$ is computed from a mammographic image using data related to system calibration and image calibration. The x-ray tube output spectrum is assumed to be relatively stable but the anode heel effect is corrected for. The mammographic imaging process has several parts which might vary from day to day. In order to effect meaningful image analysis by computer, it is necessary to know these variations in order to make the images conform to a standard. To achieve this requires calibration data. The film-screen response, film processor and film digitizer are calibrated by collecting the following data:

1. A step wedge film: A film is produced with a stepped wedge made of lucite placed along the back of the film and a lucite block placed over the automatic exposure control. This film allows us to calibrate the film-screen system and film-processing so that energy imparted to the intensifying screen can be related to film density.

2. A "blank" film: A film is taken with a short time of exposure with no object (breast) present. The exposure has to be short so that the film does not saturate. An exposure of 0.04 seconds, at 100 mA and 28 kV for example produces a film that has film densities that vary between 1.8 and 2.6 (despite looking black). This film provides information about the spatial variations of the incident radiation intensity.

3. The digitized image of step wedge film: The film density on each step of the wedge is measured so that once digitized, the relationship between pixel value in the digital image and film density in the corresponding area of the film is known.

As well as calibrating the system components, data specific to each mammographic examination is needed. In particular:

The tube voltage ($V_{tube}$ kV);
The tube current ($I_{tube}$ mA);
The time of exposure ($t_s$ s);
The breast thickness (H cm).

Most of this information is readily available but measuring the breast thickness H is currently awkward since the radiographer has to measure it using a ruler; though newer machines are incorporating automatic measurement of breast thickness.

Given a mammographic image, the thicknesses of interesting and fatty tissue between the x-ray source and each pixel can be found by considering the energy imparted to the intensifying screen at each pixel which is obtained from the pixel values in the image using the calibration data. Let $E_{pse}(x, y)$ be the energy imparted to the screen in the area corresponding to the pixel (x, y). $E_{pse}(x, y)$ contains both scatter and primary components. The primary component $E_p(x, y)$ is determined by subtracting a scatter estimate from the total energy imparted as mentioned above.

Now for a pixel with $h_{int}$ cm of interesting tissue and $h_{fat}$ cm of fatty tissue above the corresponding area of the intensifying screen, the total attenuation at any energy E is expected to be:

$$h\mu(E, x, y) = h_{int}(x, y)\mu_{int}(E) + h_{fat}(x, y)\mu_{fat}(E) \quad (1)$$

$$= h_{int}(x, y)(\mu_{int}(E) - \mu_{fat}(E)) + H\mu_{fat}(E),$$

where the substitution $h_{fat}(x, y) = H - h_{int}(x, y)$ is made.

In this case, the energy expected to be imparted to the intensifying screen by the primary photons is:

$$E_p(x, y) = \phi(V_{tube}, x, y) A_p t_s \quad (2)$$

$$\int_0^{V_{tube}} N_0^{rel}(E) ES(E) G(E) \times e^{-\mu_{plate}(E) h_{plate}} e^{-h\mu(E,x,y)} dE,$$

where $\phi$ is the photon flux for an x-ray tube voltage of $V_{tube}$, this varies across the image due to the anode heel effect; $A_p$ is the pixel area; $t_s$ is the time of exposure; $N_0^{rel}(E)$ is the relative number of photons at energy E; S(E) is the absorption ratio of the screen to primary photons of energy E, G(E) is the transmission ratio of the grid for primary photons of energy E; $\mu_{luc}(E)$ is the linear attenuation coefficient of the (typically) lucite (compression plate) at energy E; and $h_{plate}$ is the thickness of the compression plate, all of which are known from the calibration or image conditions.

Note that after substituting Equation (1) into Equation (2) the only unknown is $h_{int}(x, y)$. This can be found by equating the primary energy found in the practical case (i.e. measured from the image) with the theoretical value (i.e. the expected value calculated above) and solving the resulting nonlinear equation to determine $h_{int}(x, y)$.

This process of converting the image into the $h_{int}$ representation can be visualised as converting the original image so that the fat has risen to float on top of the interesting tissue surface, then the fat is peeled off leaving the representation $h_{int}(x, y)$. Informally, this representation can be viewed as a surface and clinically significant effects such as masses appear as features on this surface, eg. small hills, as seen for example in FIG. 5. Note that this is fundamentally different from regarding the intensity image as a surface, since the $h_{int}$ representation is a quantitative measure of anatomical tissue which is distributed through vertical pencils of the breast. The importance of $h_{int}$ stems from the fact that it factors out the imaging parameters particular to the examination to yield a representation of the intrinsic anatomy that is ultimately what is relevant for diagnosis.

SUMMARY OF THE INVENTION

The present invention is concerned with improvements in the calculation of the $h_{int}$ representation, which not only improve the accuracy of the $h_{int}$ representation but also provide some very useful results along the way.

A first aspect of the invention provides a method of correcting a digital representation of an x-ray image for degradation caused by a digitiser, the digital representation being a measurement of the image density for each of a plurality of pixels of the image, the measurement being obtained by illuminating the x-ray image, measuring the attenuation of the light by the x-ray image and calculating from the attenuated light values of the image density, the method comprising the steps of:

calculating from the pixel values in the digital representation the value of the intensity of said attenuated light corresponding to each pixel;

applying to the intensity values a modulation transfer function to correct for the degradation introduced by the digitiser; and converting the corrected intensity values back into values representative of the image intensity.

A second aspect of the invention provides, in a method of x-ray imaging using an intensifying screen to receive x-rays and emit light to be recorded on an x-ray film, a method of calculating from the x-ray image density the energy which was imparted to the intensifying screen, comprising the steps of:

calibrating the x-ray film and intensifying screen by measuring the response of the x-ray film and intensifying screen to a plurality of different intensities of received x-rays;

fitting a theoretical model of the expected response to the measured response, and using the fitted theoretical model to calculate the imparted energy from the x-ray image density.

A third aspect of the invention provides, in a method of x-ray imaging in which an intensifying screen is used to receive x-rays and emit light to be recorded on an x-ray film, the image recorded on the film is digitised to give a pixelised digital representation of the image density on the film, a method of enhancing the digital representation of the image to remove the contribution thereto of glare from the intensifying screen comprising the steps of:

converting the digital representation of image density into a representation of the energy imparted to the screen; and deconvolving the representation of the energy imparted to the screen using a weighting mask defining the point spread function for the intensifying screen to remove the contribution thereto of glare from the intensifying screen.

A fourth aspect of the invention provides a method of calculating from a mammogram the compressed thickness of the imaged breast, comprising the step of delimiting in the mammogram the region corresponding to the part of the breast which is compressed from the region corresponding to the uncompressed breast edge by detecting the smoothness of curves of equal intensity in the mammogram.

The aspects above may be combined with other known steps to improve the production of an $h_{int}$ representation of the breast.

Another aspect of the invention provides a method of detecting microcalcifications in a breast from a mammogram of the breast, comprising the steps of processing the mammogram to produce an $h_{int}$ representation according to the above methods, converting the value of $h_{int}$ for a candidate region into a value representative of the volume of interesting tissue and thresholding the volume values to detect as microcalcifications areas of the mammogram where the volume value exceeds a threshold.

The invention also provides apparatus for carrying out the above methods. Further, the invention also provides a computer program, which can be provided on a computer-readable storage medium, for controlling a computer to carry-out the methods.

BRIEF DESCRIPTION OF THE DRAWINGS

The present invention will be further described by way of example with reference to the accompanying drawings in which:

FIGS. 20 and 21 illustrate roughness measures used in the estimation of breast thickness;

FIG. 22 shows the coordinate system used for extra-focal compensation;

FIG. 24 shows two examples of the extra-focal component of the radiation.

DESCRIPTION OF PREFERRED EMBODIMENTS

An embodiment of the invention will now be described by going through the steps necessary to calculate the $h_{int}$ representation. These can be summarized as follows:

(1) Convert pixel value P(x, y) to film density D(x, y) using the digitiser calibration data;

(2) Remove digitiser blur;

(3) Convert film density D(x, y) to energy imparted to intensifying screen $E^{imp}_{pse}(x, y)$ using film-screen calibration data;

(4) Compensate $E^{imp}_{pse}(x, y)$ for intensifying screen glare;

(5) Compensate $E^{imp}_{pse}(x, y)$ for the anode-heel effect and diverging x-ray beam;

(6) Estimate the thickness of the compressed breast;

(7) Estimate the scattered radiation $E^{imp}_{s}(x, y)$;

(8) Estimate the extra-focal radiation $E^{imp}_{e}(x, y)$ components;

(9) Compute the measured primary energy $E^{imp}_{p}$:

$$E^{imp}_{p}(x, y) = E^{imp}_{pse}(x, y) - E^{imp}_{s}(x, y) - E^{imp}_{e}(x, y)$$

(10) Compare this measured primary energy with the theoretical primary energy calculated by equation (2) for different values of $h_{int}(x, y)$. Equating the measured and theoretical values using a numerical approach solves for $h_{int}(x, y)$.

Digitisation

Considering steps (1) and (2), mammographic images are digitised by illuminating the mammogram with light and measuring the amount of light transmitted through it. Various arrangements are used such as laser-scanning devices or devices which use a light box to illuminate the mammogram and a CCD camera to record the transmitted light. Digitisers are designed to record and output the pixel values related to the film (image) density rather than the transmitted light itself because the film density is independent of the illumination level.

Step (1) of the method above is relatively straightforward because modern high-quality laser scanning devices, for instance, have a known linear relationship between the film density and the pixel value:

$$P(x, y) = mD(x, y) + c,$$

where m and c are constants.

Thus D(x, y) can easily be found from the pixel value.

Figure 25:
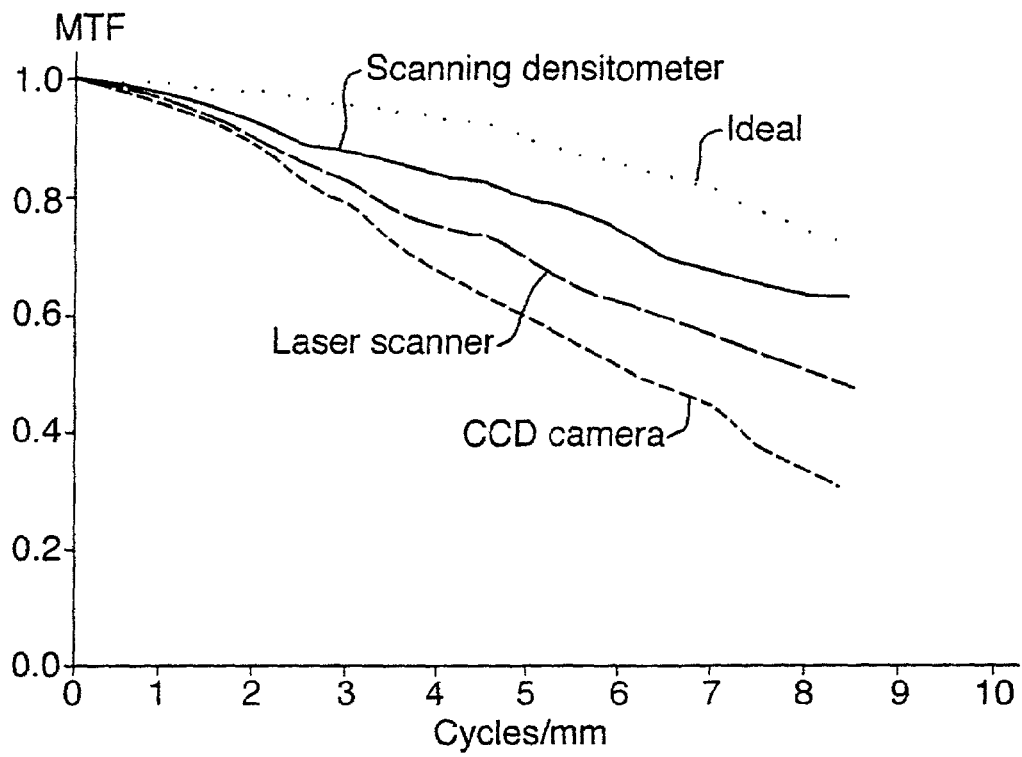
FIG. 25 shows the modulation transfer functions of some film digitizers.

A first aspect of the invention concerns step (2), the removal of digitizer blur. The modulation transfer function which show the degree of blur for various digitizers are known or can be measured. For instance, the modulation transfer functions for a scanning microdensitometer, CCD camera and a laser scanner are disclosed in "Digital Mammography - the comparative evaluation of film digitizers" by D. H. Davies, British J. Radiology, 66:930-933, 1993 and are shown in FIG. 25. With the present invention, however, these functions are applied not to the film density value, but to the transmitted light $T_l$ which is related to the film density in a non-linear way as follows:

$$T_l(x, y) = I_l(x, y) \times 10^{-D(x, y)}$$

where $I_l$ is the light illuminating the film in the digitizing process and $T_l$ is the light emerging from the film. This transmitted light is calculated and the modulation transfer functions for the digitizer are applied to it to remove the digitizer blur. Then the transmitted light is reconverted into the film density (now without the digitizer blur) by dividing by $I_l$ and taking the log to base 10.

Film Screen Response

Figure 6:
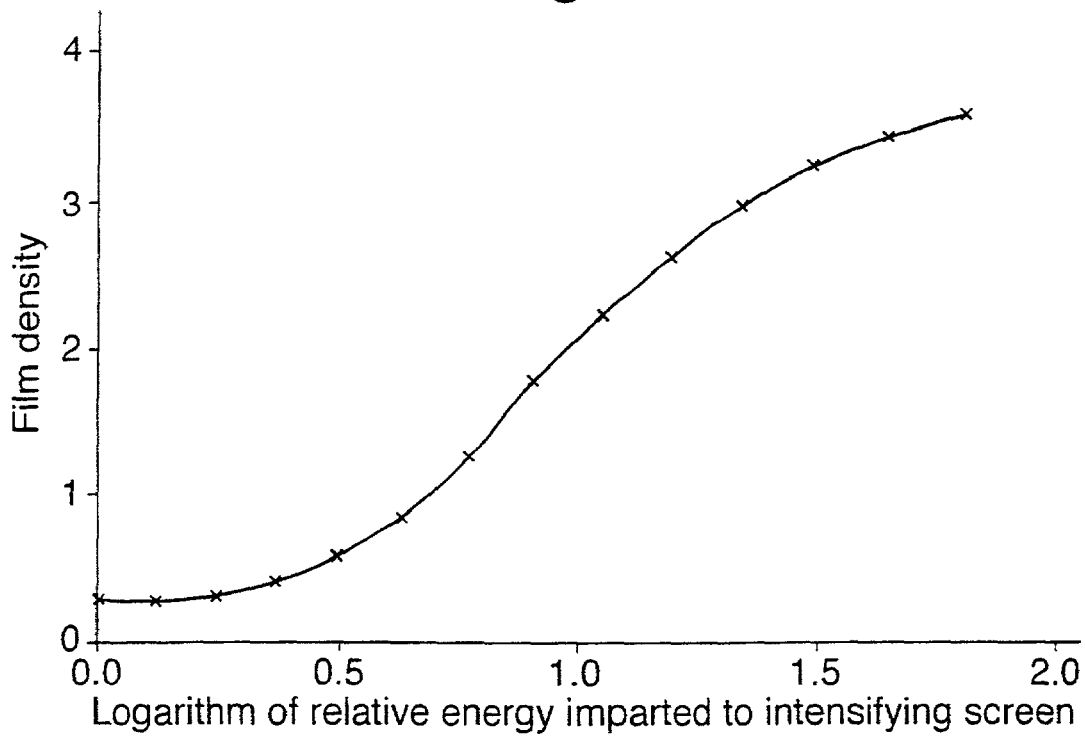
FIG. 6 shows a film-screen characteristic curve.

The next step, step (3) is to calculate from the deblurred film density $D(x, y)$ the energy imparted to the intensifying screen $E^{imp}_{pse}(x, y)$ by using film-screen calibration data. The film-screen response to energy imparted to the intensifying screen is given by a characteristic curve like that in FIG. 6. FIG. 6 shows a film-screen characteristic curve found by exposing a lucite step wedge. Lucite is chosen because of its similar absorption and scattering properties to a breast consisting of half fat, half interesting tissue. A small correction for scattered radiation can be made, and the logarithm of the calculated relative energy imparted is plotted against film density, which is measured with a densitometer.

With the invention a serpentine characteristic curve is fitted to the lucite step wedge data, and this fitted relationship is used to calculate the imparted energy from the film density. In more detail, the serpentine curve can be expressed as:

$$x^2 y + a^2 y - b^2 x = 0$$

rearranged this is:

$$y = \frac{b^2 x}{x^2 + a^2}$$

This has the properties:
Intercept at (0, 0)
Extrema at $$\left( \pm a, \pm \frac{b^2}{2a} \right)$$

Inflection at $$x = 0, x = \pm \frac{a}{\sqrt{3}}$$

Extent: $-\inf < x < +\inf$, $$\frac{-b^2}{2a} < y < \frac{b^2}{2a}$$

Symmetry (0,0)—rotational
Asymptote $y=0$
Gradient $$\frac{dy}{dx} = \frac{b^2(a^2 - x^2)}{(x^2 + a^2)}$$

Gradient at origin $$\frac{dy}{dx} = \frac{b^2}{a^2}$$

Thus $a, b$ and also the origin to use need to be determined. The origin has to be the place of symmetry so there are four unknown parameters: $a$, $b$, $x_{origin}$, $y_{origin}$. The equation of the curve becomes:

$$y = y_{origin} + \frac{b^2(x - x_{origin})}{(x - x_{origin})^2 + a^2}$$

Where $x = \log E$ (where E is the energy imparted to the intensifying screen) and $y=D$ (where D is the film density). The origin is initially guessed to be in the centre of the film-density range and the film density range is measured so as to determine initial estimates of $a, b$. An optimizing routine is used to find the optimal values of the parameters based upon the step wedge and blank film calibration data collected from the mammography unit.

Inverting gives:

$$x = x_{origin} + \frac{b^2 \pm \sqrt{b^4 - 4a^2(y - y_{origin})^2}}{2y - y_{origin}}$$

Figure 7:
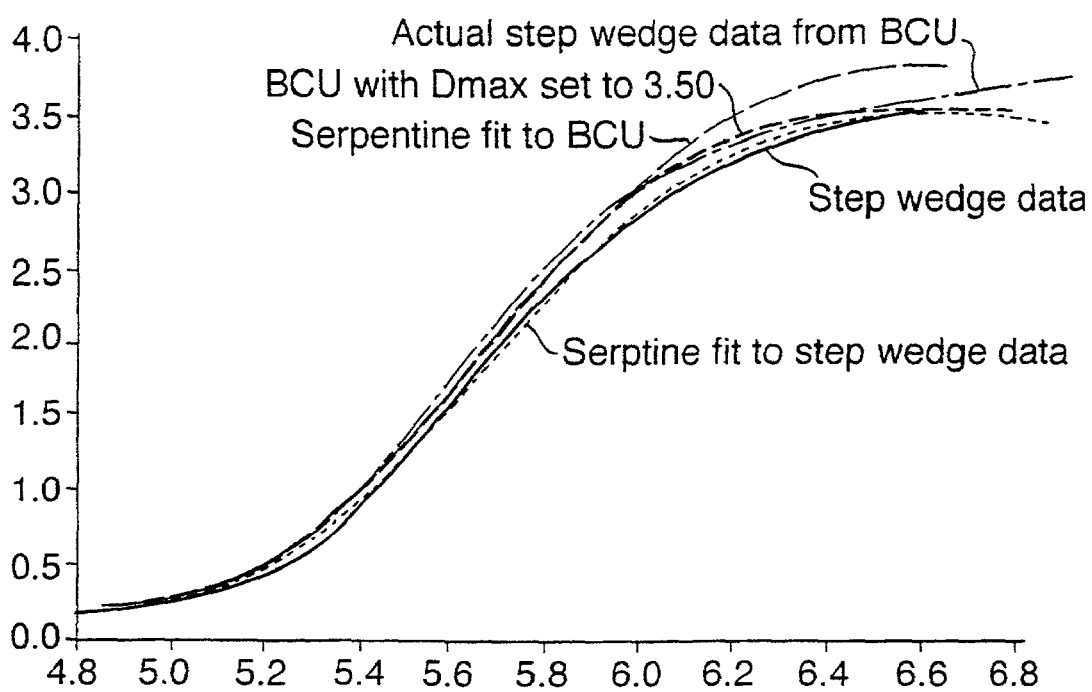
FIG. 7 shows an example of fitting the characteristic curve.

FIG. 7 shows an example of the curve fitting. In FIG. 7 the horizontal axis is the logarithm of the energy imparted to the intensifying screen. The vertical axis plots the film densities. The line marked step wedge data is the most accurate and is based upon measurements with a piece-wise linear fit between the points. The short dashed line is the serpentine fit to that data showing a good fit. BCU is data collected from the Oxford Breast Care Unit and the longer dashed line then is the serpentine fit to the data collected at the BCU which gives a good fit in the low film densities, but not such a good fit at high film densities. The fit can be improved to give the curve with long and short dashes by noting that although the film-screen curve is not symmetric in its entirety, the highest film densities are not used, so $D_{max}$ can be curtailed so that symmetry is obtained.

Glare Removal

Having calculated the energy imparted to the screen, the next aspect of the invention concerns the removal from this energy value of the contribution to it by intensifier screen glare in step (4) which is directly related to light exposure to the film. In summary this is done using a point spread function calculated by assuming that the x-ray photons are absorbed equally across each part of the intensifying screen corresponding to one pixel and at different depths within the screen. Knowing the pixel size, the solid angles between each potential absorption site and the neighbouring pixels can be computed. These solid angles define the proportion of light photons that the neighboring pixels receive. The solid angles are weighted by distance from the absorption site to the pixel (representing light absorption by the screen) and by the actual x-ray energy reaching that site. Using these values glare can be estimated and removed from an image. The mathematics of this will now be explained in detail.

Figure 32:
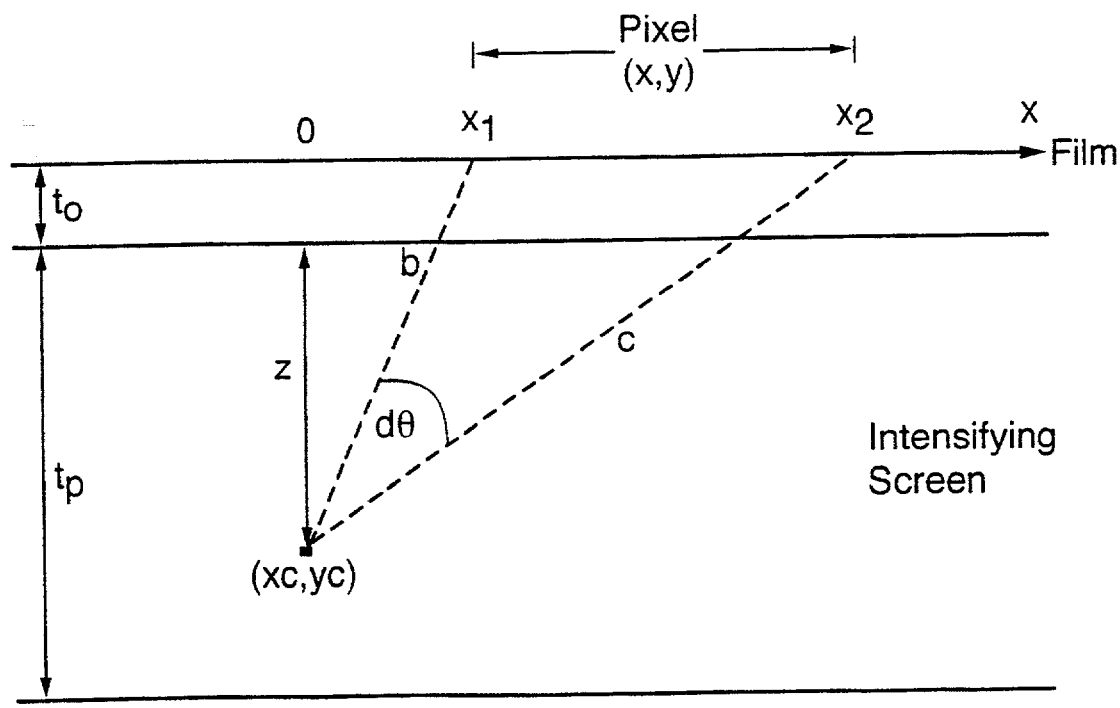
FIG. 32 illustrates the geometry for calculation of the point spread functions.

To derive the point-spread function, the screen is considered to be divided into layers and then each layer to be sub-divided into sub-pixel size units. Each of these units is considered to be a potential site of absorption of an x-ray. Let $t_p$ cm be the thickness of the intensifying screen. The screen is considered to be in n layers so that each layer has a thickness of $dt_p = t_p/n$ cm. The layer is subdivided into pixels (whatever resolution is being used) and then each pixel is split into 100 smaller elements. It is assumed that the x-ray film lies directly on top of the intensifying screen separated only by a screen overcoat so that there is a gap of $t_0$ cm between the x-ray film and the intensifying screen. For each layer a weighting mask $w_z(x, y)$ is computed (effectively the point spread function for that layer) which gives the percentage of light photons emitted at $(x_c, y_c)$, depth z, that reach the film corresponding to the spatial position (x, y). The proportion of photons from $(x_c, y_c)$ reaching (x, y) is related to the solid angle $d\theta$ from $(x_c, y_c)$, depth z to (x, y). Symmetry round the azimuthal angle is assumed and the 1D case considered (see FIG. 32):

$$d\theta = \cos^{-1}\left(\frac{(x_2 - x_1)^2 - b^2 - c^2}{-2.0bc}\right)$$

Where b, c are found from simple geometry and $x_1$ and $x_2$ are the distances to either side of the target pixel (x, y) from the central pixel $(x_c, y_c)$.

Some of the light photons that are emitted from $(x_c, y_c, z)$ are absorbed by the phosphor so that $d\theta$ is weighted using Beer's law and the relative glare becomes:

$$\text{relative glare} = d\theta e^{-\frac{\mu_{phosphor}^{light} z}{\cos\theta}}$$

Where $\mu_{phosphor}^{light}$ is an average linear attenuation value. Dividing the relative glare by the total relative glare gives a weighting mask for each layer. The x-ray energy being imparted to each layer is now incorporated. The energy into each layer is:

$$E_z^{imp}(x_c, y_c) = E^{in}(x_c, y_c)e^{-\mu_{phosphor}^{x-ray}z} - E^{in}(i\ x_c, y_c)e^{-\mu_{phosphor}^{x-ray}(z+dt_p)}$$

where $E_z^{imp}$ is the energy imparted and $E^{in}$ is the incident energy. So the relative glare now becomes:

$$\text{relative glare} = d\theta e^{-\frac{\mu_{phosphor}^{light} z}{\cos\theta}} E_z^{imp}(x_c, y_c)$$

These values are combined for each layer and for each sub-pixel to get the full weighting mask w(x, y) and the results are scaled so that $\Sigma_{(x,y)} w(x, y) = 1.0$ and rotated around the central pixel to give a two dimensional mask.

Figure 26:
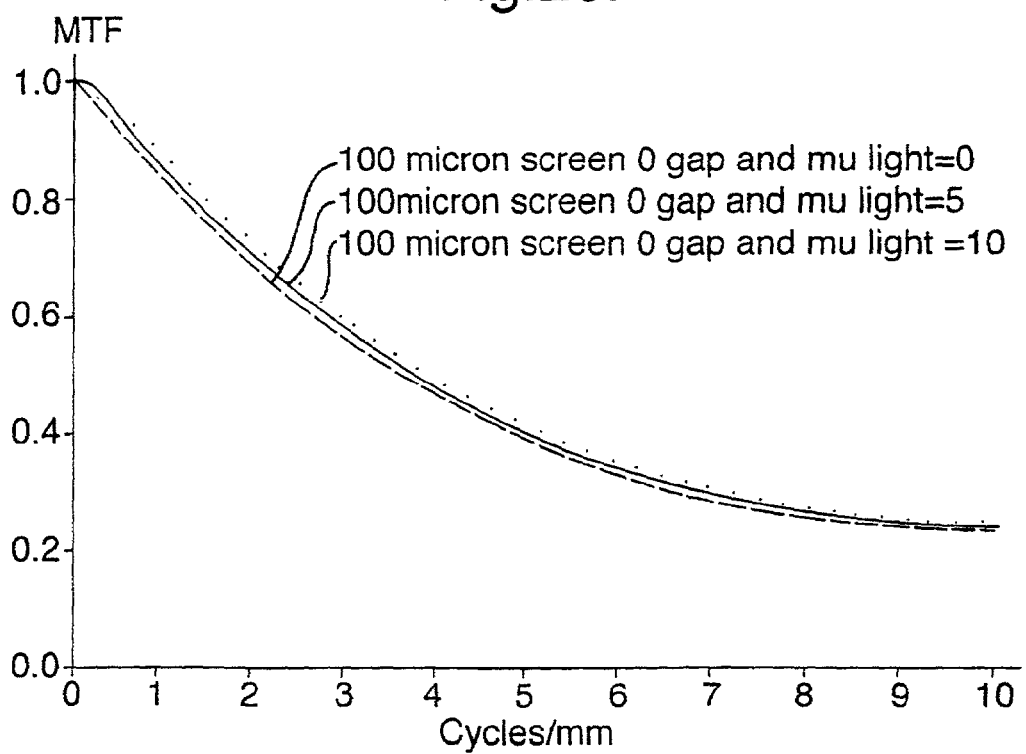
FIG. 26 illustrates the modulation transfer functions of intensifying screens for different values of the attenuation coefficient for light in phosphor.
Figure 27:
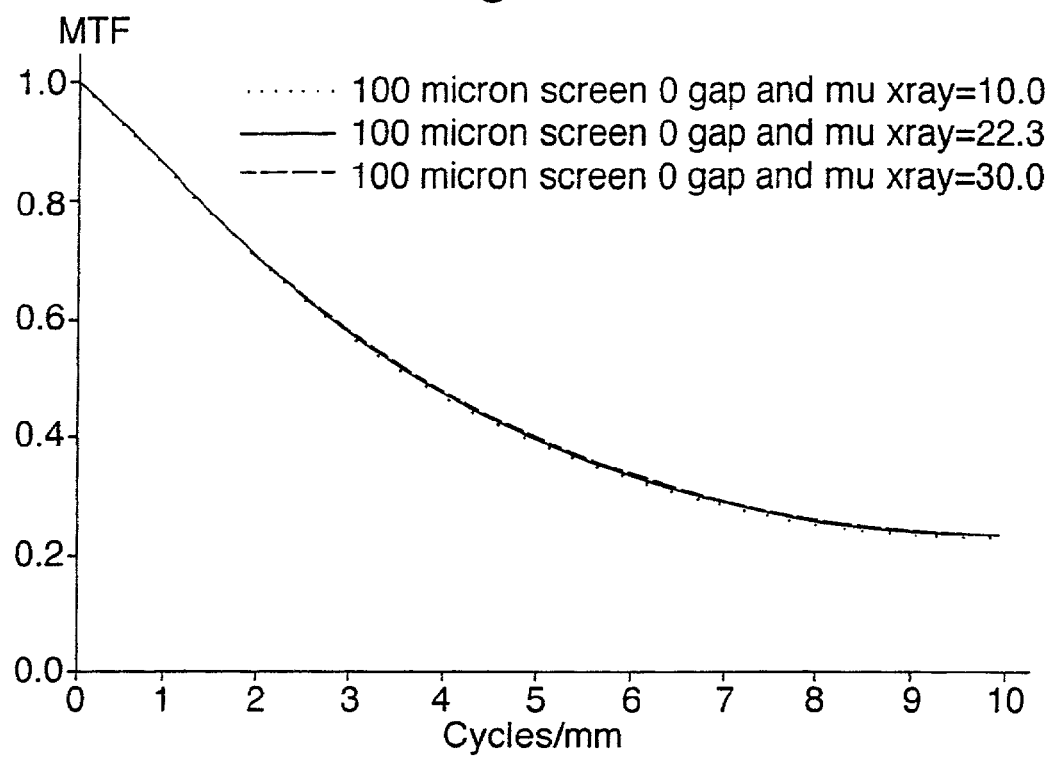
FIG. 27 illustrates the modulation transfer functions of intensifying screens for different values of the attenuation coefficient for x-rays in phosphor.

The parameters $\mu_{phosphor}^{xray}$, $\mu_{phosphor}^{light}$ are included in the model more for illustrative purposes than practical value since it turns out that they have little effect on the PSF, which is the crucial factor. FIGS. 26 and 27 show the modulation transfer functions (MTFs) of screens in which the varying parameters are $\mu_{phosphor}^{xray}$ and $\mu_{phosphor}^{light}$. The modulation transfer function is simply the Fourier transform of the point spread function. FIG. 26 shows the MTF of intensifying screens using the model with 100 micron screen thickness and 0 gap between the film and the screen. There are three curves representing three different values of $\mu_{phosphor}^{light}$. As the value rises the more direct path to the film becomes more heavily favoured and so the MTF improves. FIG. 27 shows the MTF of intensifying screens using the model with 100 micron screen thickness and 0 gap between the film and the screen. There are three curves representing three different values of $\mu_{phosphor}^{x-ray}$. As the value rises more x-rays get absorbed nearer the film and so the MTF improves.

Figure 28:
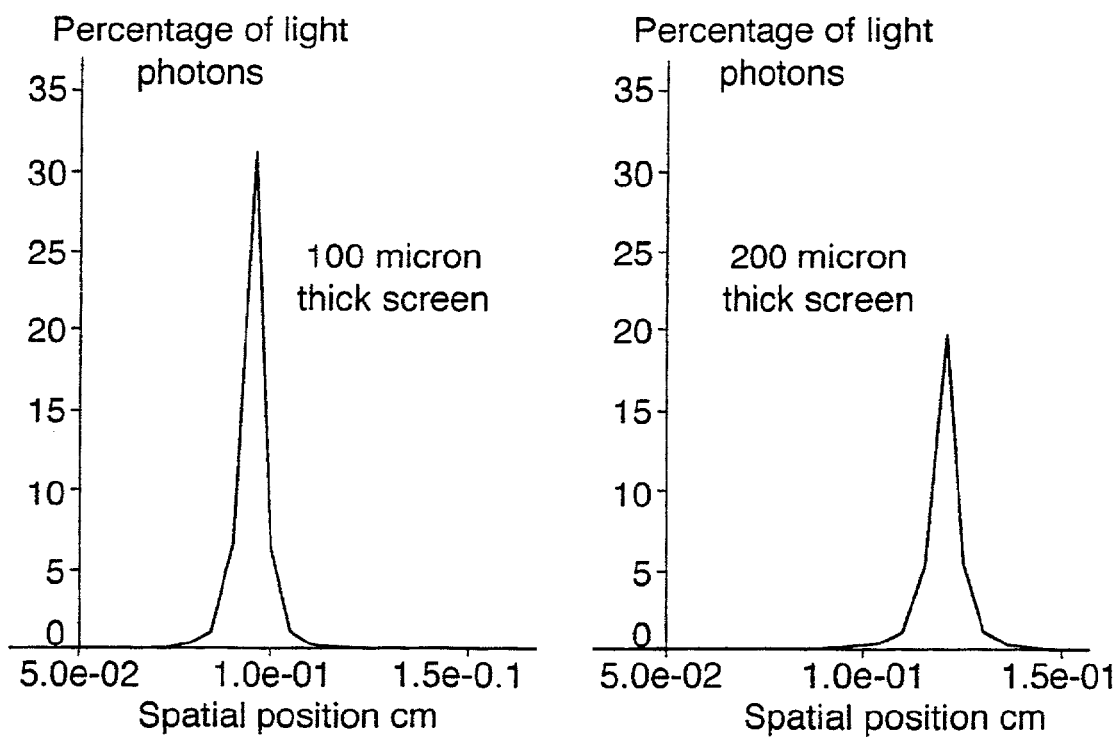
FIG. 28 are graphs showing the point spread functions for two different screen thicknesses.
Figure 29:
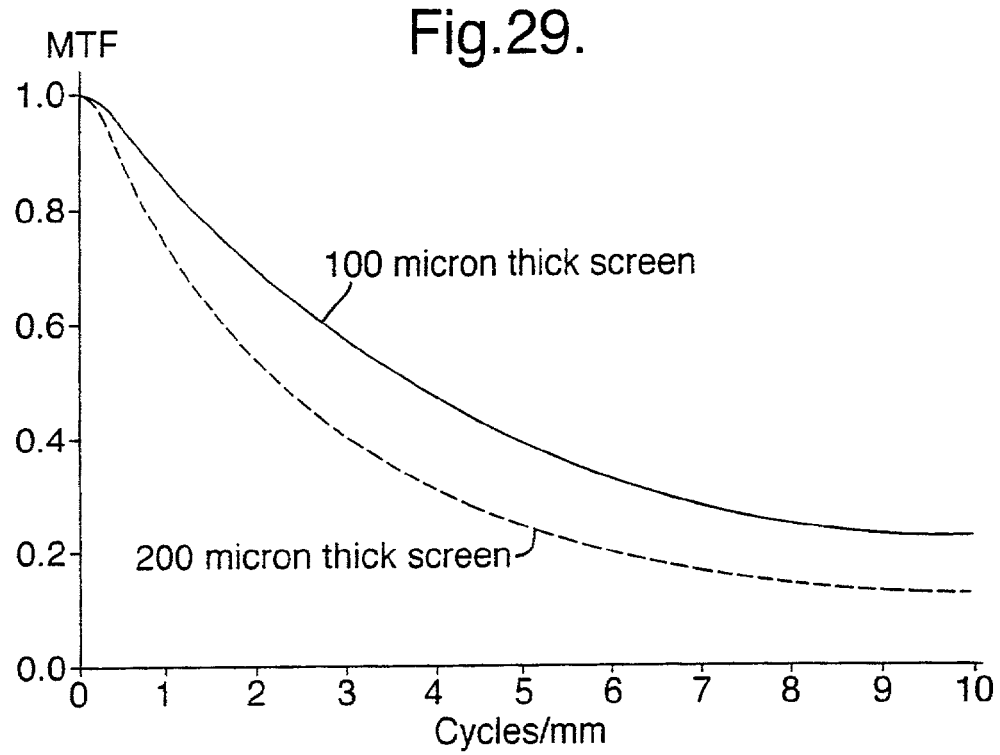
FIG. 29 illustrates the modulation transfer function of two intensifying screens of different thicknesses.
Figure 30:
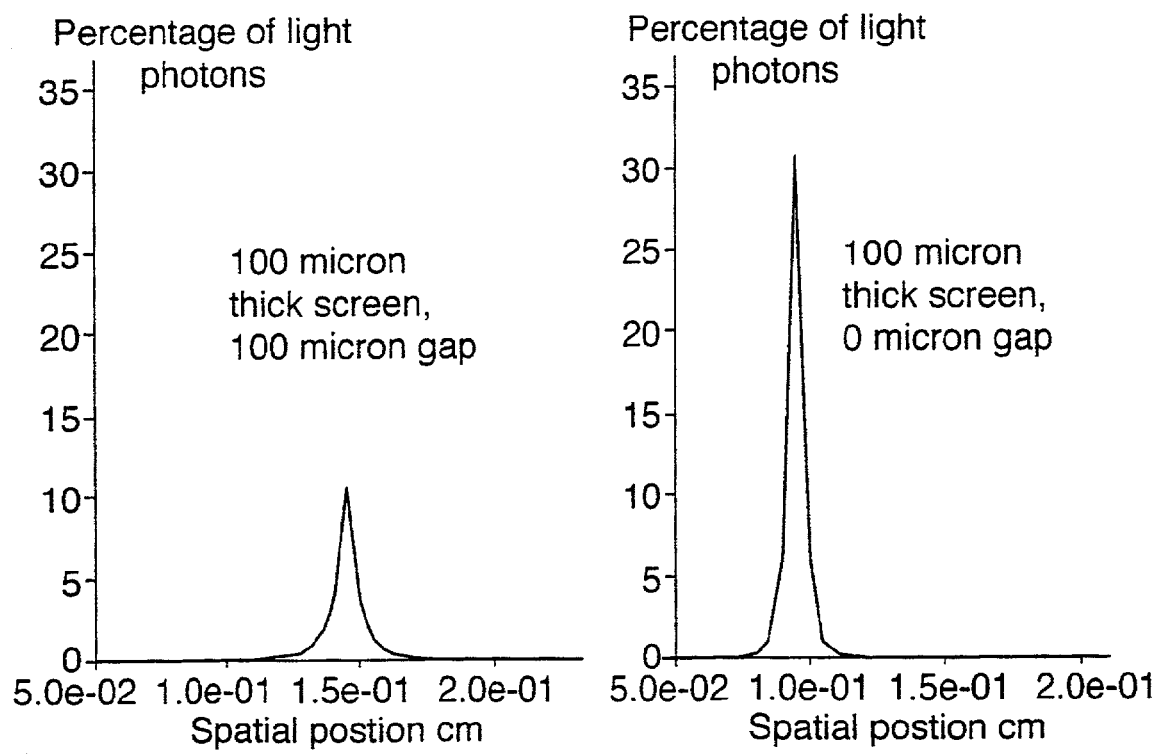
FIG. 30 illustrates the point spread function of two intensifying screens for different gaps between the x-ray film and the screen.
Figure 31:
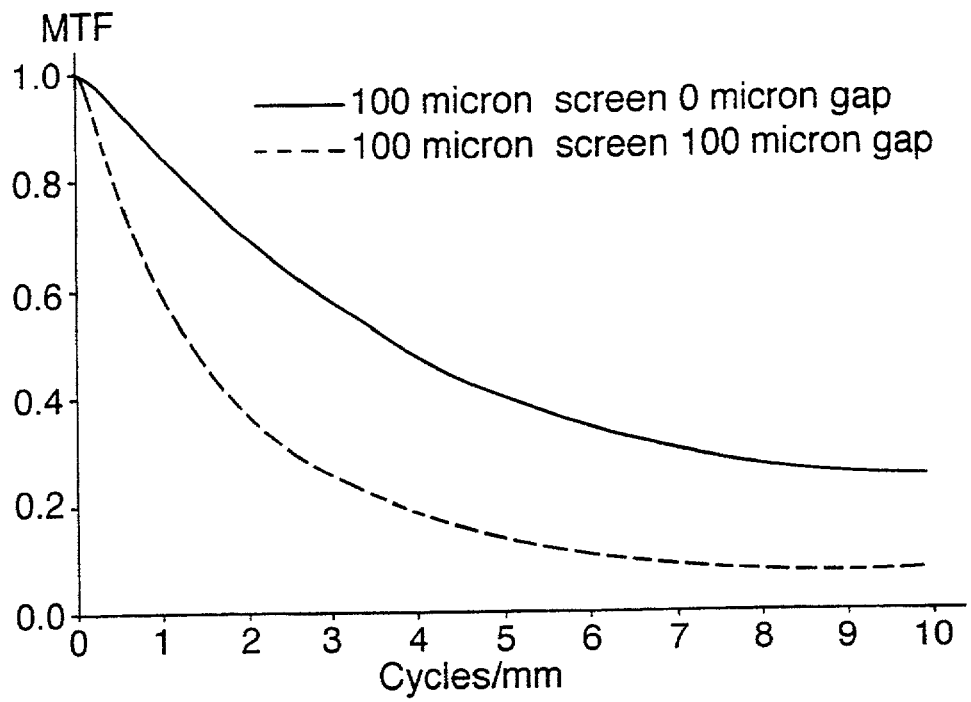
FIG. 31 illustrates the modulation transfer functions of two intensifying screens for different gaps between the film and screen.

The two most important parameters in the model are the screen thickness $t_p$ and the gap between the film and the screen $t_0$. FIG. 28 shows the PSFs for two different screen thicknesses. The graphs show the percentage of light photons emitted from the central pixel (where the peak is) and travelling to the surrounding pixels. The graphs are profiles across the 2D masks for when the spatial resolution is 50 microns. On the left, the screen is 100 microns thick, whilst on the right its 200 microns thick. The thicker the screen the greater the absorption of the x-ray photons at depths further away from the film and thus the more spread out the light emitted by the screen. The MTFs (for zero gap) are shown in FIG. 29. FIGS. 30 and 31 show the PSFs and MTFs of when the gap between the film and the screen is varied. FIG. 30 shows the PSF of two intensifying screens and using the model with 100 micron screen thickness and 0 and 100 micron gap between the film and the screen as marked. FIG. 31 shows the MTF of two intensifying screens using the model with 100 micron screen thickness and 0 and 100 micron gap between the film and the screen as marked. Clearly, these parameters have a large effect on the screen performance and they are an important part of the calibration data. For example the intensifying screen Fiji UM Mammo Fine enclosed within a Fuji EC-MA cassette has a thickness ($t_p$) of approximately 100 microns. The gap between film and screen is much more difficult to estimate and information from manufacturers is sparse. However, there is probably at least a 1 micron protective coating on the film emulsion and a further protective coating of 5-15 microns for the screen.

To properly compensate for glare it is necessary to know exactly where the edges of the mammographic film are since no glare comes from outside the film and those areas should be treated as zero in the convolution. Also, the energies imparted outside the breast area but on the film saturate the film so that to model the true effect of glare the energies on those regions have to be set to the expected incident energy as computed using the known time-of-exposure. The weighting mask w defines the point spread function for the intensifying screen so that the energy imparted image attained is simply the result of the energy imparted without glare convolved with w:

$$E^{glare} = E^{no\ glare} * w$$

Figure 8:
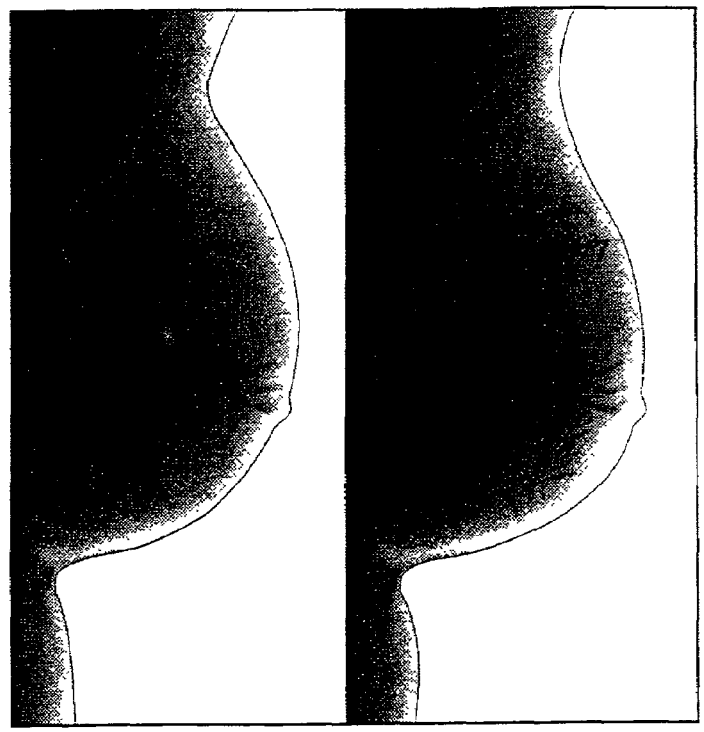
FIG. 8 shows an example of the effects of compensating a mammogram for intensifying screen glare.

This can be solved by deconvolution in the Fourier domain. FIG. 8 shows an example of the effects of compensating for the glare.

Noise Detection

Although the glare has been removed to enhance the calculation of $h_{int}$ in steps (5) to (9) above, this step is itself important in that it allows the detection of microcalcifications and in particular allows a distinction to be made between microcalcifications and film-screen "shot" noise which can look confusingly similar to an image analysis system.

Film-screen "shot" noise can arise from dust and dirt on the intensifying screen or from deficiencies in the film. A major difficulty in detecting microcalcifications is that this noise tends to appear with similar characteristics to the calcification: small, low film density (bright) and high frequency. Consequently, automated detection of microcalcifications as localised bright spots tends to generate many false positives. Although some of these can be eliminated by using the clustering property of real microcalcifications it would be preferable to be able to eliminate them individually. The present invention uses the absence of blur from bright spots to mark them as noise. The absence of blur indicates they were introduced into the imaging chain after the glare from the intensifying screen.

Figure 9:
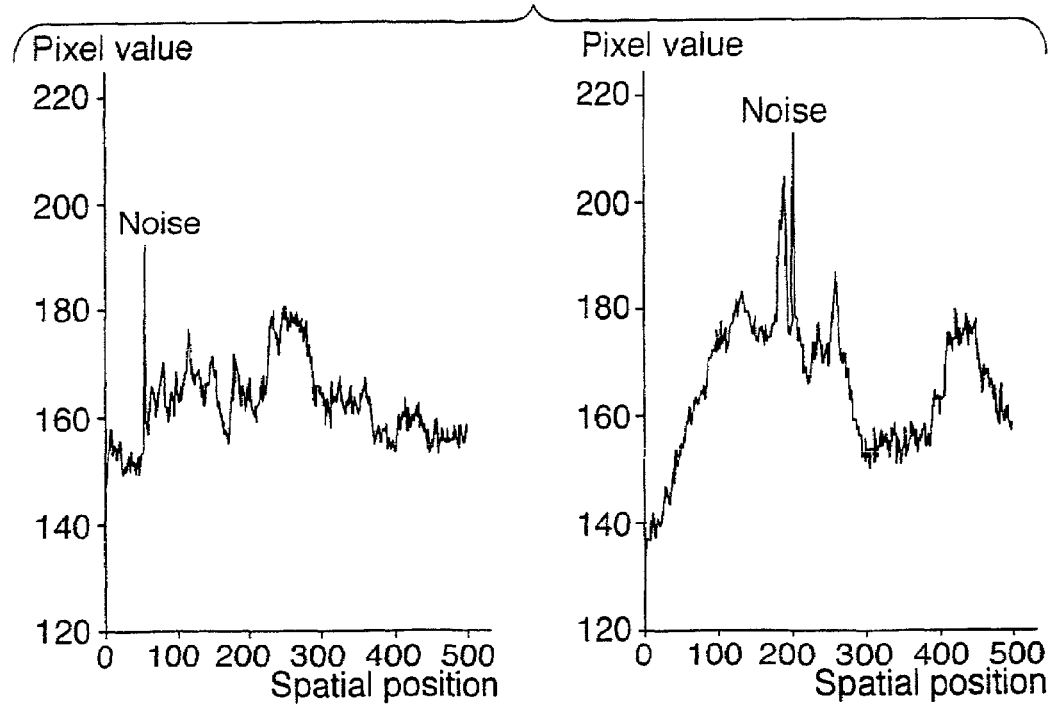
FIG. 9 shows two film density profiles with confirmed shot noise in them.
Figure 10:
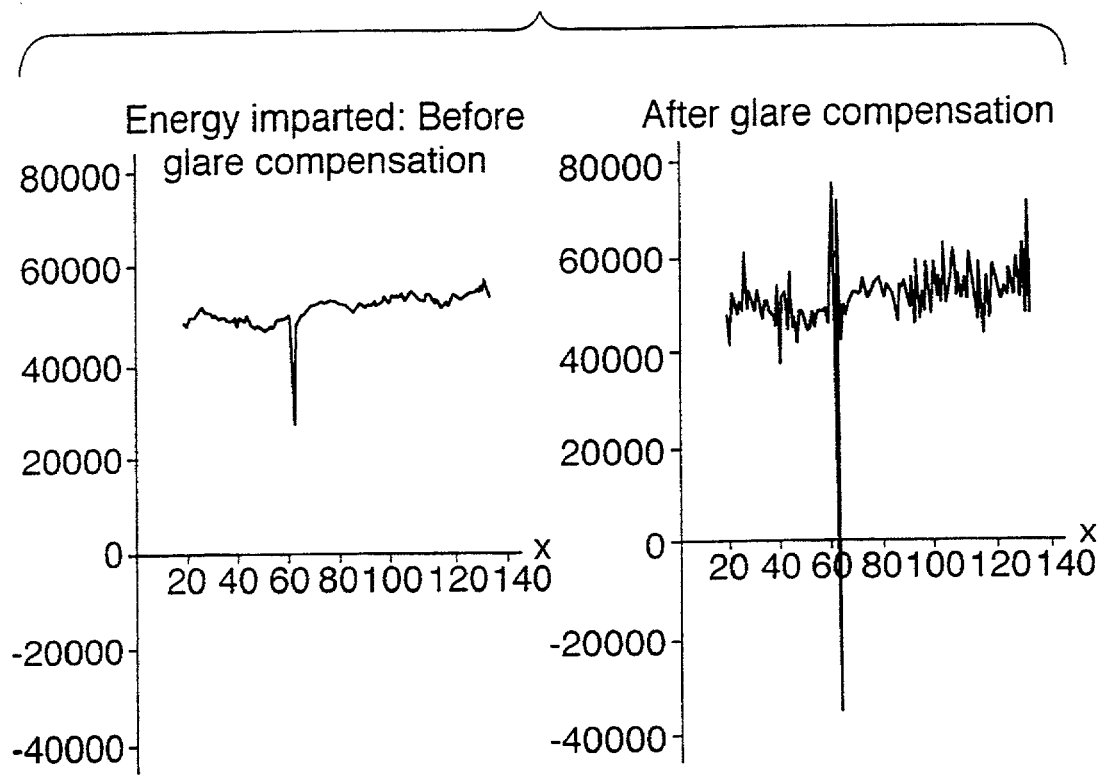
FIG. 10 shows an original energy profile and the energies after glare compensation.

In the above method of glare removal the mammogram is first transformed into an image which represents the energy imparted to the intensifying screen. In this representation calcifications and noise have very low values due to their apparent "high x-ray attenuation". When glare is removed from the image, pixels with low energy values due to noise become negative indicating that the original energy value was not feasible. FIG. 9 shows two film density profiles with confirmed shot noise in them. It shows two profiles across 100 micron images containing microcalcifications. The pixel value on the y-axis is linearly related to film density, with high pixel value meaning low film density and thus low energy imparted to the intensifying screen. In the left profile the image restoration algorithm for glare picks out x=50 as being film-screen noise, and in the right profile the point at x=206. The peaks at x=190 and x=250 in the right profile are real calcifications. FIG. 10 shows an original energy profile and the energies after glare compensation. It shows two profiles across a 100 micron energy image. The left profile shows the energies imparted before glare compensation. There is a low value at x=62 which is due to noise (low energy means it appears white). The right profile shows the energies after glare compensation, the energy at the noise point is now negative, i.e. it has been introduced to the image after the major blurring stage.

Figure 11:
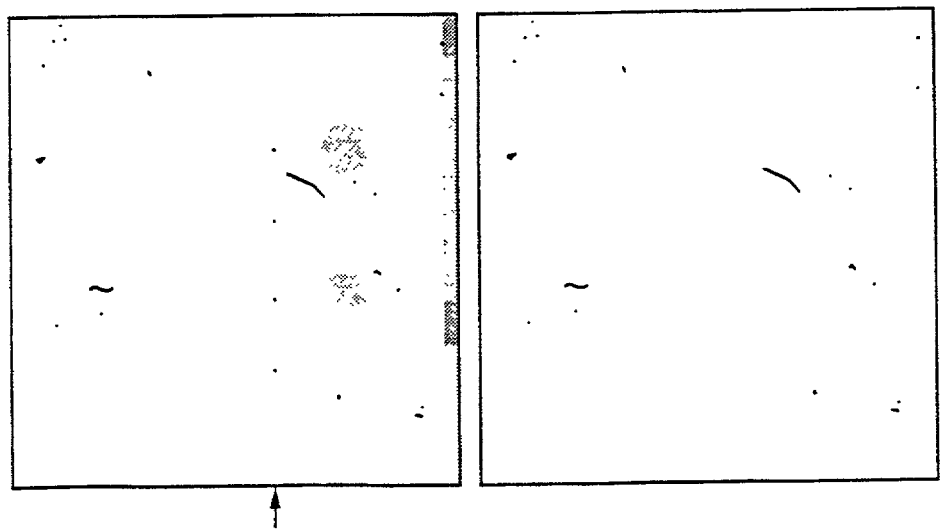
FIG. 11 shows an example of noise detection in a phantom.

FIG. 11 shows an example of a physical phantom (TOR-MAX, University of Leeds, Department of Medical Physics, X-ray Test Object) and the noise that the detection scheme finds. The image on the left is of a physical mammographic phantom. The phantom has simulated microcalcifications (pointed at by the arrow), round cylinders of varying densities and, at the far right, patches of texture. Before the mammogram was performed the film-screen combination was opened up and dust and dirt distributed randomly—these show-up as being bright white on the left image. The results of the noise-detection algorithm are shown on the right. All the obvious noise pixels have been detected as well as some far more subtle ones, none of the simulated calcifications have been marked as noise.

Figure 12:
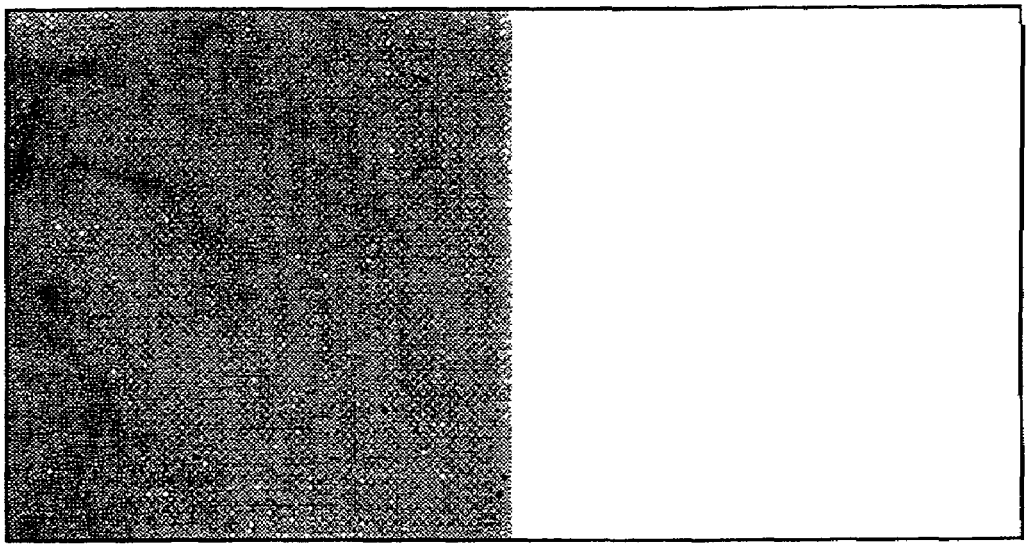
FIG. 12 shows an example of noise detection on a real mammogram.
Figure 13:
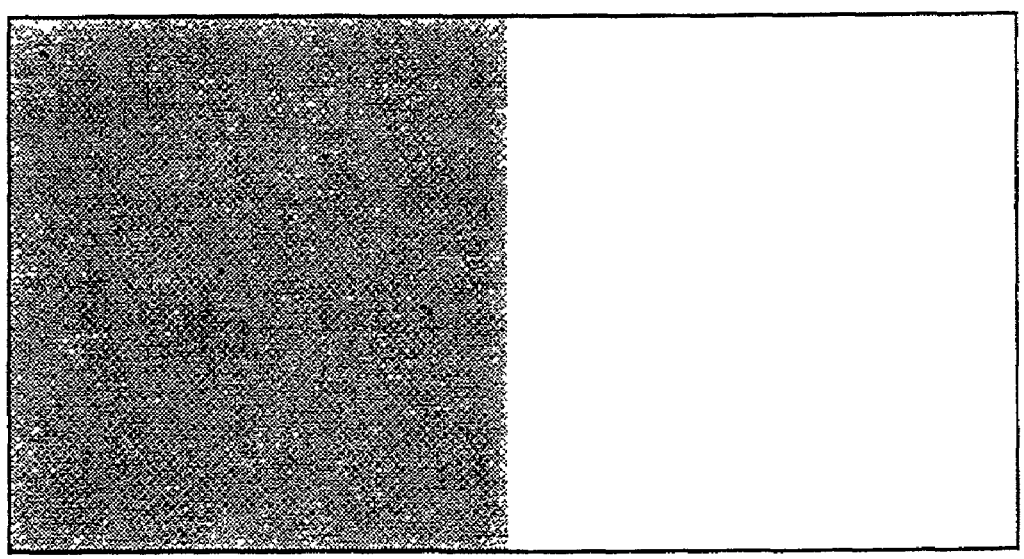
FIG. 13 shows a further example of noise detection on a real mammogram.

Extensive testing of the film-screen shot noise detection algorithm has been carried out on real mammograms. On a set of 20 sections of mammograms many of which contained microcalcifications an experienced radiologist marked the points corresponding to film-screen shot noise. She marked 156 points of which the above algorithm detected 150. The algorithm also detected 6 more points which the radiologist was unable to state categorically whether they were noise or real microcalcifications. No definite microcalcifications were marked as noise. FIGS. 12 and 13 show examples of mammograms and the noise detected. Referring to FIG. 12 on the left is a section of a real mammogram digitised to 100 microns per pixel. There is a cluster of noise points as confirmed by an experienced radiologist and by the algorithm as seen on the right which shows in white the noise detected. There is a quite obvious hair in the top right corner and some subtle genuine microcalcifications in the bottom left corner which have not been marked as noise. Referring to FIG. 13 on the left is a section of a real mammogram digitised to 50 microns per pixel. There is a whole cluster of noise points as confirmed by an experienced radiologists and by the algorithm as seen on the right which shows in white the noise detected.

Although this noise detection scheme works extremely well, there are two considerations which should be noted:

(i) At points where the film is saturated, that is where it has very high film density, or at very low film density such as in those areas beneath lead markers the estimated energy imparted is inaccurate and that can affect the noise detection. However, this happens only at the very edges of the breast image well away from any likely calcifications. An example of this is in FIG. 11 where the very low film densities at the top of the image are marked as noise.

(ii) Noise points affect the noise detection at points near to them. The glare removal requires the energies in a local neighbourhood. If one of the energies is artificially low due to noise then the glare removal might be incorrect and might cause other noise not to be detected. This can be seen in FIG. 11 where there is a hair which clearly has the end points marked but not the central ones. This can necessitate a two-pass glare removal algorithm or require that any pixels nominated as calcifications within a certain radius of a noise point are also considered noise.

This method for detecting microcalcifications can be further improved. It may be recalled that the fundamental assumption underlying the generation of the $h_{int}$ representation is that the breast consists entirely of fat and "interesting tissue". Since calcifications have an x-ray attenuation coefficient which is about 26 times higher than those tissue types, the attenuation of an x-ray beam through a microcalcification, perhaps of diameter 0.5 mm, is comparable to that through 1.3 mm of interesting tissue. For this reason, the $h_{int}$ value computed for pixels which in fact correspond to calcifications is expected to far exceed those which correspond to non-calcifications.

Based on this the improved method uses the "interesting tissue volume", denoted by $v_{int}$, which represents the total amount of interesting tissue present in a mass of breast tissue. $v_{int}$ can be computed from the $h_{int}$ values over the region of interest on the image. Now consider the $v_{int}$ value of a small volume of breast tissue, B, whose actual volume is $v_{act}$. If no calcification is present in B, $v_{int}$ should be bound above by $v_{act}$. However, if B is a calcification, the computed $v_{int}$ would exceed $v_{act}$ owing to the violation of the fundamental assumption of the $h_{int}$ model. Thresholding the $v_{int}$ to $v_{act}$ ratio, enables differentiation of calcifications from other breast tissue. This ratio is subject neither to varying imaging conditions nor to different tissue backgrounds on which a calcification is projected. This is contrary to image contrast, which is what most other calcification detection algorithms use.

Candidate regions of the mammogram can be segmented e.g. those that satisfy a weak contrast constraint and which are not too large. The calcification, of course, has other breast tissue above and below it which because of the projective nature of the mammogram contributes to the image. This contribution is removed by estimating the background $h_{int}$ (from the $h_{int}$ values surrounding the candidate region) and subtracting it. $v_{int}$ can then be calculated. The estimation of $v_{act}$ is more difficult, and to do this the heuristic assumption is made that the candidate microcalcification has an elliptical cross section, so that its volume can be estimated from its projection in the image.

In an initial experimental study a total of 20 image samples taken from 7 different mammograms were used. The images are digitised to a resolution of 50 μm per pixel. There are altogether 27 microcalcifications in the 20 samples, each of which has at least 1 microcalcification. A 100% true positive rate is obtained along with 0 false positives per image when the $v_{ratio}^{int}$ threshold is set to 3. The algorithm detects 4 other regions which the radiologists are unable to make conclusive remarks on whether they correspond to real calcifications or non-calcifications.

Figure 14:
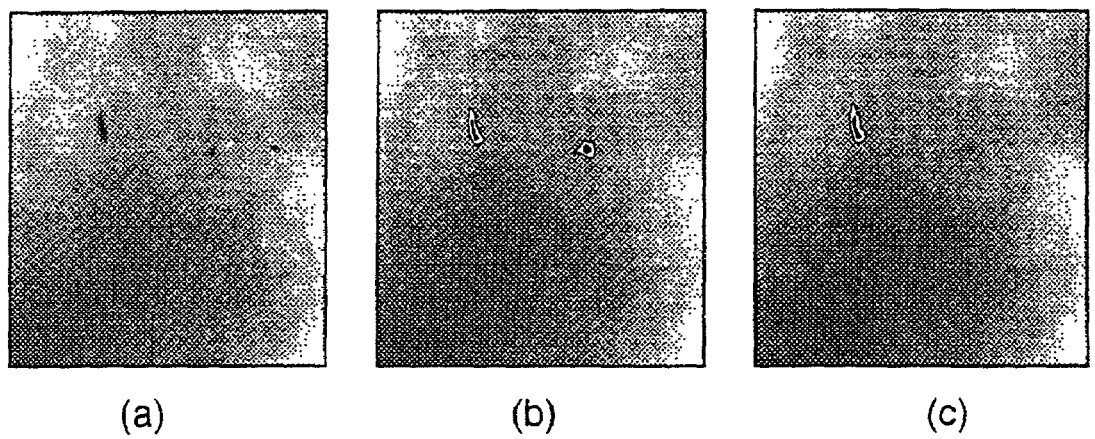
FIG. 14 illustrates the detection of low contrast calcifications.

The results were also compared with those obtained by simply thresholding the grey level contrast. An ROC analysis shows that this method achieves both higher sensitivity and better specificity, albeit on a small sample. FIG. 14 shows an example which compares a typical contrast-based detector attempting to detect a low-contrast microcalcification with the improved method above:

(a) the original image with 2 microcalcifications;
(b) detection result using the volume ratio algorithm: both calcifications are detected successfully;
(c) detection result using grey level contrast: the more obscure calcification on the right is missed.

Figure 15:
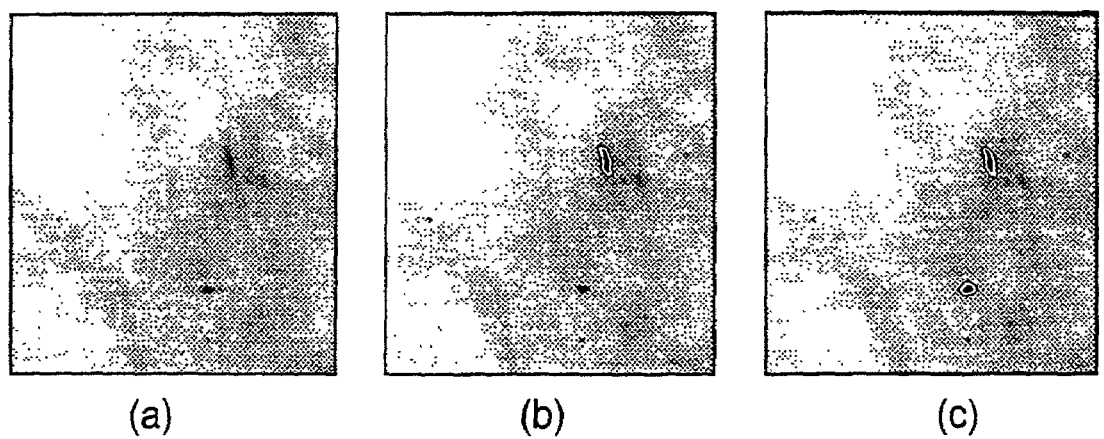
FIG. 15 illustrates an image sample containing shot noise.

Thus the glare removal process of the invention enables the elimination of many false positives that correspond to noise. FIG. 15 shows an image sample containing image shot noise:

(a) the original image with 1 microcalcification and a number of image shot noise points scattered over the image, of which the one lying horizontally near the bottom of the image is very prominent;
(b) detection result using the volume ratio algorithm: the region corresponding to shot noise is eliminated and only the real calcification is marked;
(c) detection result using grey level contrast: the image shot noise is wrongly marked as a calcification.

Algorithms based on contrast measures have difficulty rejecting such false positives. Thus despite the $h_{int}$ representation explicitly calcifications it is useful for detecting them and for differentiating false-positives due to shot noise.

Anode Heel Effect

Returning to improvements in the calculation of $h_{int}$, the next step is to correct for the anode heel effect in step (5).

The primary component of incident energy at (x, y) is directly proportional to the number of photons incident to the volume of tissue projected onto that pixel:

$$E_p^{imp}(x, y) = \phi(V_t, x, y) t_s A_p E_{p_{nd}}^{imp}(x, y), \quad (3)$$

where the last term is used to denote that part of Equation 2 which is independent of the total number of photons (nd stands for not-dependent). It is assumed that the x-ray energy spectrum stays the same but that the total number of photons $\phi(V_t, x, y)$ changes with (x, y) due to the anode heel effect and diverging beam. The scatter component at the pixel (x, y), mostly comes from the x-ray photons that are entering the breast tissue in the surrounding neighbourhood. This neighbourhood is small enough to allow the anode heel effect over it to be ignored so that the scatter component is also directly proportional to the incident radiation at (x, y):

$$E_s^{imp}(x, y) = \phi(V_t, x, y) t_s A_p E_{s_{nd}}^{imp}(x, y), \quad (4)$$

The total energy imparted is the sum of the primary and scatter components so that using Equations 3 and 4 gives:

$$E^{imp}(x, y) = \phi(V_t, x, y) t_s A_p (E_{p_{nd}}^{imp}(x, y) + E_{s_{nd}}^{imp}(x, y)), \quad (5)$$

The incident photon flux is greatest underneath the anode, let the position on the film at this point be $(x_a, y_a)$. The aim is to change $E^{imp}(x, y)$ to be as if from that incident photon flux.

$$E_{corrected}^{imp}(x, y) = \frac{\phi(V_t, x_a, y_a)}{\phi(V_t, x, y)} E^{imp}(x, y), \quad (6)$$

The ratio of the two photon fluxes needs to be computed. To determine the anode heel effect for a specific system and to thus compute the ratio an x-ray exposure is performed with no object present which gives an apparently "blank film". For example, nine points on the film can be sampled. The energy imparted to the screen comes mostly from the primary radiation since there is no scattering material:

$$E_{blank}^{imp}(x, y) = \phi(V_t, x, y) t_s A_p (E_{p_{nd}}^{imp}(x, y) + E_{s_{nd}}^{imp}(x, y))$$

$$E_{blank}^{imp}(x_a, y_a) = \phi(V_t, x_a, y_a) t_s A_p (E_{p_{nd}}^{imp}(x_a, y_a) + E_{s_{nd}}^{imp}(x_a, y_a))$$

Noting that since the parts of the signal not dependent on the number of photons are equivalent (there is no object) gives:

$$\frac{\phi(V_t, x_a, y_a)}{\phi(V_t, x, y)} = \frac{E_{blank}^{imp}(x_a, y_a)}{E_{blank}^{imp}(x, y)}$$

Substituting this into Equation 6 allows compensation for the anode heel effect.

Estimation of Compressed Breast Thickness

An important step in this method is the estimation of the compressed breast thickness H. This is needed for an accurate calculation of $h_{int}$, but is also useful in checking the accumulated radiation dose per unit volume, and in locating the nipple which is important for diagnosis.

Many recent mammography systems have built-in analogue or digital thickness meters but their accuracy and precision are currently wanting. In clinical practice, most existing systems do not have such indicators.

This aspect of the invention provides a robust and accurate method for estimating the compressed breast thickness from a mammogram using image processing and modelling techniques above. The estimation is based upon the existence of the "breast edge", a fatty area around each breast where the breast thickness steadily reduces to zero. Determining that area using image processing provides enough data to estimate the breast thickness when calibration data such as the tube voltage and exposure time are known. The technique can also be applied to mammograms taken previously.

Figure 16:
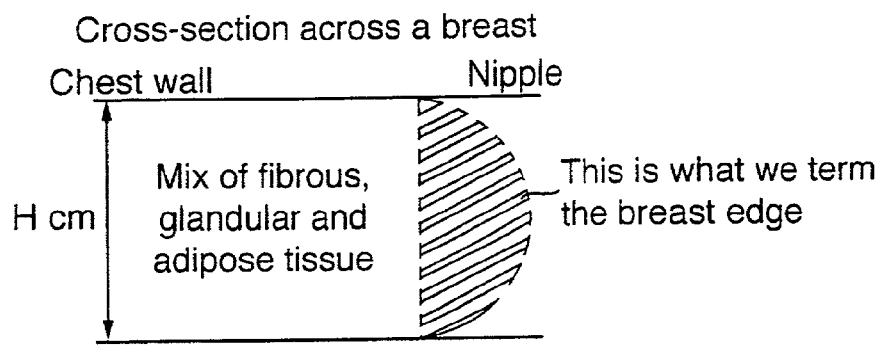
FIG. 16 schematically illustrates a cross-section across a compressed breast.

During mammography, the breast is compressed between two supposedly parallel flat compression plates. The compression causes the breast to spread out, so that over most of the plate the breast is of equal thickness. However, towards the edge of the breast the breast bulges like a balloon and there is a not a straight vertical edge; FIG. 16 shows this schematically. This bulge is what we term the breast edge.

Figure 17:
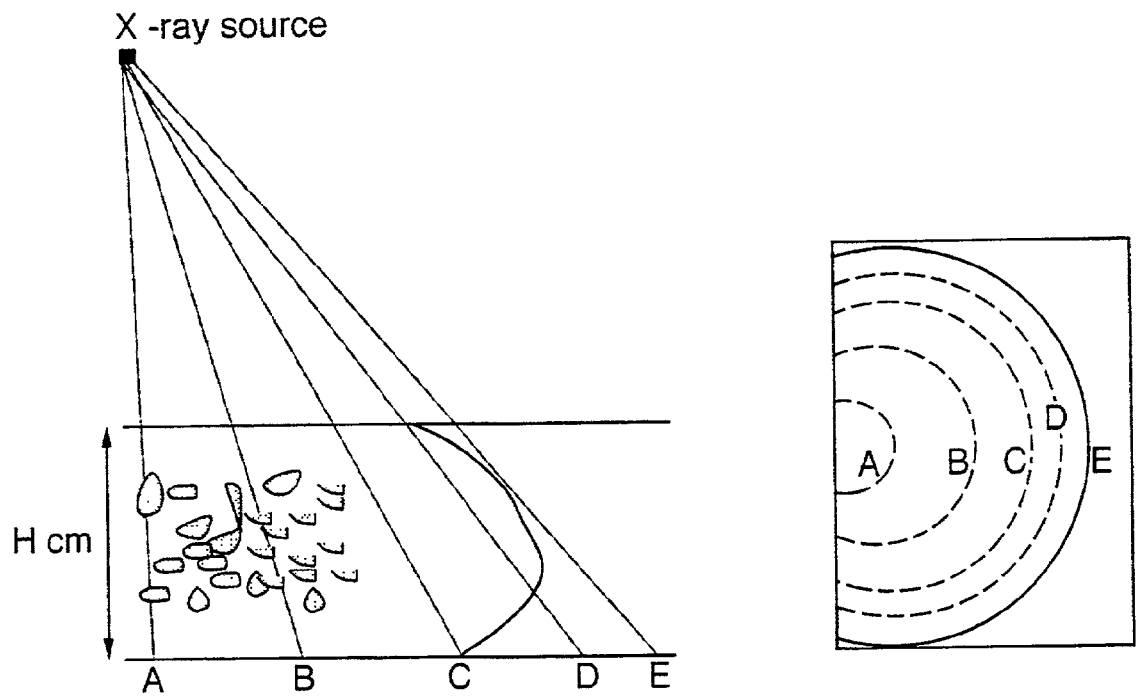
FIG. 17 is a schematic of a cranio-caudal mammogram.

The breast tissue is enveloped in two layers of fibrous tissue, the deep layer overlying the muscle, and the very thin superficial layer beneath the skin. The superficial layer is separated from the skin by 0.5 to 2.5 cm of subcutaneous fat or areolar tissue. Joining the layers to the skin are fine fibrous ligaments (Cooper's ligaments). From this, it is reasonable to assume that what is termed here the breast edge consists entirely of fat, though in localized regions, particularly near the nipple and near the ligaments, this will not be strictly true. FIG. 17 is a schematic of a cranio-caudal mammogram (not to scale). The left picture shows the breast, while the right picture is the mammogram. The shaded areas are meant to represent volumes of interesting tissue. The arc denoted by the letter E lies right on the edge of the breast as seen from the x-ray source, that is, an x-ray from the source tangentially touches the breast before reaching E. There is very little attenuation of the x-ray beam anywhere along E. Along the arc denoted by the letter D, there is a greater thickness of tissue than at E, but still relatively little attenuation, since this is the breast edge and most of the breast tissue is fat. Along the arc C, there is H cm of fat so that the x-ray attenuation is quite large but it is still uniform along the arc. This changes for arcs A and B, where there is a heterogeneous mixture of tissues. The x-ray attenuation along these arcs can vary from being due to H cm of fat to almost H cm of interesting tissue.

This method of determining breast thickness H is based-upon delimiting the projected breast edge from the interior of the breast, i.e. to determine the arcs C and E in FIG. 17. The breast can be segmented from the background to determine the smooth arc E on the basis of the film densities. Then all the pixels which are slightly brighter than those on E are marked to get anther smooth curve, since this is still in the homogeneous breast edge. This may be arc D. Eventually, arc C is reached, which is still smooth, since it is just within the homogeneous breast edge region. If pixels are continued to be marked which are slightly less dark, it starts to mark pixels within the interior of the breast. These could be anywhere and numerous since the interior is a heterogeneous mix of tissues. Thus the arc that delimits the interior of the breast (arc C) is the extremum of the smooth iso-intensity curves. From this model, it is also clear that the breast tissue between arc C and the x-ray source comprises H cm of fat. Thus, if C can be found, and given a good model of the mammographic imaging process, the pixel values along C can be used to estimate the amount of fat which must have been between the pixels along C and the x-ray source thus giving the breast thickness H.

Figure 18:
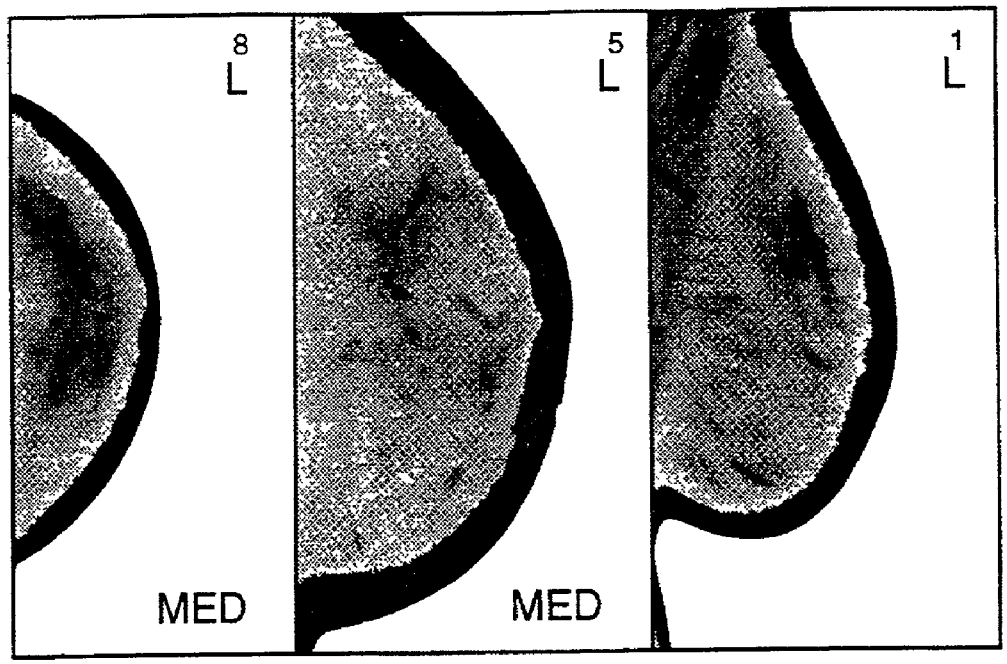
FIG. 18 shows examples of the breast edge.

There are two possible approaches to finding the curve which delimits the breast interior and then estimating the breast thickness. One is to find the smooth curve by using the original pixels values which are produced by the digitiser. The imaging process is then simulated using different breast thicknesses until the predicted pixel value matches that which is found on the smooth curve. The second approach is to take a rough initial estimate of the breast thickness and then to generate the $h_{int}$ representation. Analysis of the $h_{int}$ representation enables determination of how the estimate of the breast thickness should be changed. When the $h_{int}$ values are generated using an accurate breast thickness, it is found that within the projected breast edge there is so little attenuation that there cannot even be H cm of fat within that region. For these regions $h_{int}$ is set to zero and then it is determined what thickness of fat alone would give the observed attenuation. FIG. 18 shows some examples of the breast edges found by marking those pixels that have $h_{int}=0$. The bright white areas represent the so-called breast edge. This is where the breast starts to decrease from its constant thickness H and the attenuation is no longer enough even to be of H cm of fat. The inner edge of the projected breast edge region is mathematically quite smooth. Compensation for compression plate slant (typically up to 0.5 cm from the chest-wall out to the nipple) is performed by effectively adding a wedge of fat to the breast by adjusting the mammographic image using monoenergetic modelling assumptions.

The method of determining H is to start with an underestimate of the breast thickness and then to compute the $h_{int}$ representation. Those pixels that have $h_{fat}=H$, $h_{int}=0$ are marked and a measure of how rough the curve that those pixels represent is computed (see below). Initially, the $h_{int}$ values will be too high and there will be no pixels with $h_{int}=0$. As H increases, more and more pixels are detected with $h_{int}=0$ and these pixels will represent a smooth curve. This continues until the internal breast region is reached at which point the roughness measure rises dramatically to indicate a rougher curve.

Figure 19:
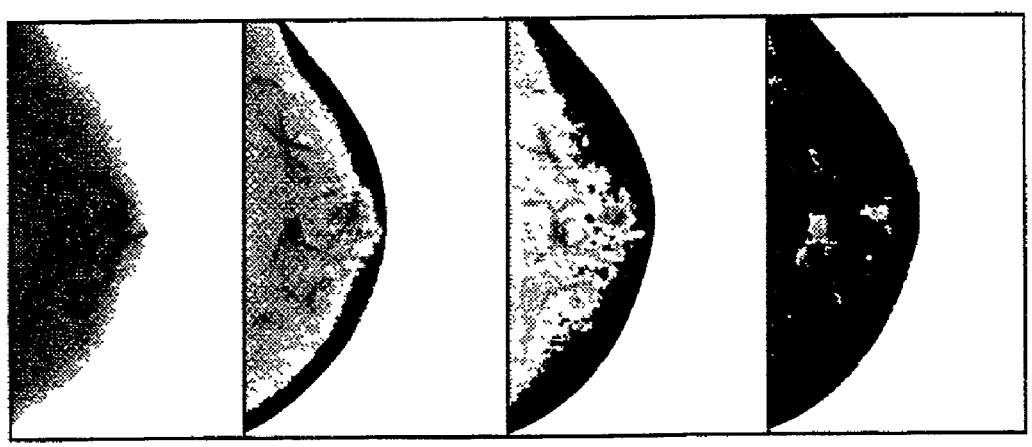
FIG. 19 shows examples of the breast edge with varying H.

Performing the computation this way rather than just using the pixel values in the original image and looking for iso-intensity curves allows more accuracy since H can be used to predict scattered and extra-focal radiation. It also enables checking that the algorithm is working properly. For example starting with many points that have $h_{int}>H$ then the value of H is far too low and should be increased it dramatically rather than in small steps. Another example is that if more that 20% of the breast is found as being within the projected breast edge, then H has increased too far. FIG. 19 shows real examples of the breast edge as H varies. This shows images with luminance proportional to $h_{int}$ except for the bright white breast edge which is where $h_{int}=0$. The breast thicknesses tried are marked above each image. The first value, 3.4 cm, is far too low—there is no breast edge; the second value, 5.4 cm is just about right—there is a substantial breast edge and a smooth internal edge; the last two estimates are far too high—the projected breast edge has become ragged.

As for the computation of roughness, as breast thickness increases a large jump in the measure is expected just after the correct value. In FIG. 20, the curves marked A-E would ideally have the roughness measures as shown on the right.

There are several possibilities for such a roughness measure but the approach in the invention is to use an estimate of a fractal characteristic of the curve. A fractal curve has two parameters: fractal dimension and D-dimension, and for estimating image textures the latter is more reliable, stable and gives better discrimination. A technique to estimate the D-dimension: "the covering blanket" which is based upon morphological operations is used. To compute the measure, two further curves are created from the $h_{int}=0$ curve: one from opening the $h_{int}=0$ curve and one from closing it (see FIG. 21). An opening operation creates a smaller curve which is smoother than the original, whilst a closing operation creates a larger curve which is smoother than the original. The area contained between the two curves is a measure of roughness: the larger the area the rougher the curve. A 5 pixel by 5 pixel disk is used as our morphological operator and the thickness estimation is performed on 300 micron resolution images.

Although the area between the curves is related to roughness, it is also directly related to the total length of the curve, so it is normalised and made dimensionless by dividing by the length of the curve. Taking all these considerations into account the roughness is the number of pixels enclosed by closing and opening of $h_{int}=0$ divided by the number of pixels on the $h_{int}=0$ curve. When this measure increases above a threshold of 1.3 increase of H is stopped.

In this estimate of breast thickness, the smooth curve which delimits the interior breast region is detected. The presence of Cooper's ligaments in the image, which is quite unusual, would affect only a section of the curve and only slightly the overall roughness measure. The increased density of tissue around the nipple just means that the curve is not a semi-circle but a more irregular shape that is still smooth. Indeed, the fact that the curve is less regular can be used to detect the position of the nipple.

There are several ways of forming an initial (under) estimate of breast thickness from the calibration data and image. One way exploits the fact that near the chest wall there is low scatter and the breast tends to be fatty so one can assume $h_{int}=0$, $h_{fat}=H$. From the energy imparted H can be estimated. Another way is to assume that near the breast edge there is pure fat and some nominal, high scatter-to-primary ratio. Another way is to estimate an initial value for the breast thickness using a film density that is known to be outside the breast and the calibration data; this always gives an underestimate of the actual breast thickness.

Bounds on the breast thickness can also be estimated to check that the method is not trying infeasible breast thicknesses. The lower bound on H is related to the minimum attenuation apparent within the breast image. To achieve such low attenuation requires a certain minimum thickness of breast tissue. The minimum possible H occurs if the breast tissue has very low fat content so that $h_{int}=H$ (i.e. highly attenuating). An upper bound on H can be determined in exactly the same way except using the maximum attenuation and considering the breast to be nearly all fat.

As indicated in the introduction, the scattered radiation can be estimated using a published technique, achieving step (7), and then the extra-focal radiation must be removed in step (8).

In this embodiment the extra-focal radiation is found by using the "inner projected breast edge" found in the estimation of H above.

The extra-focal radiation is assumed to be travelling in random directions much the same as light from the sun on a cloudy day and is arriving at a point on the intensifying screen from all directions equally. If the thickness and the composition of the breast along some curve C is known, the expected primary and scatter components along C can be estimated. The extra-focal component along C can be found by subtracting them from the known total energy imparted:

$$E_e^{imp} = E_{pse}^{imp} - E_s^{imp} - E_p^{imp}$$

this value is then extrapolated over the entire image.

Figure 1:
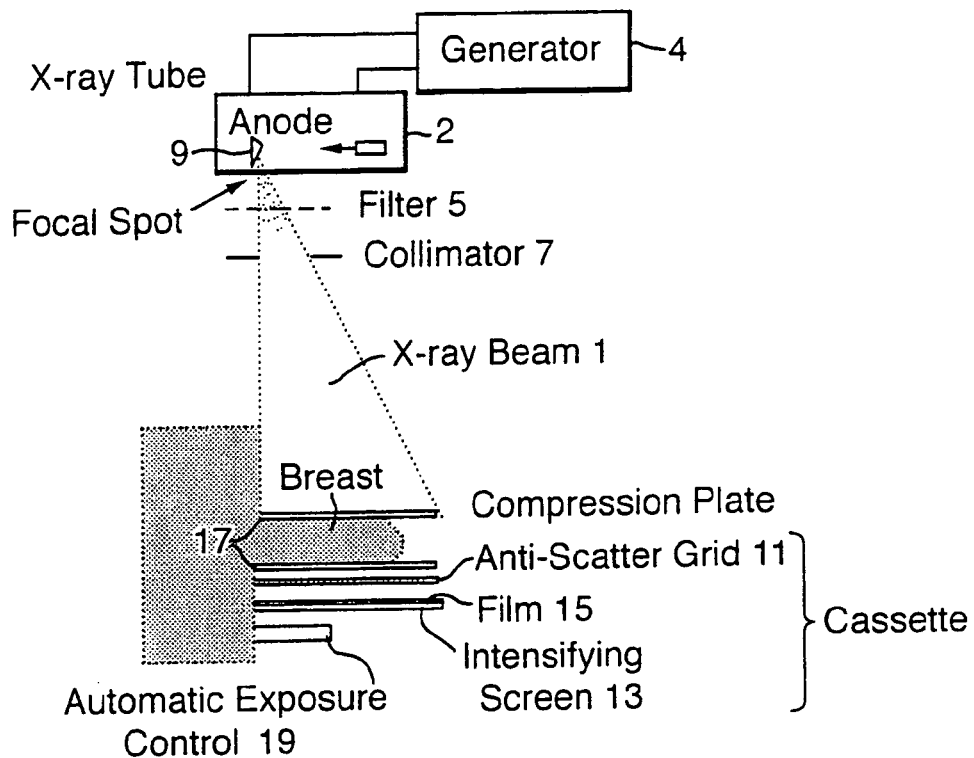
FIG. 1 is a schematic representation of a conventional screen-film mammographic system.
Figure 2:
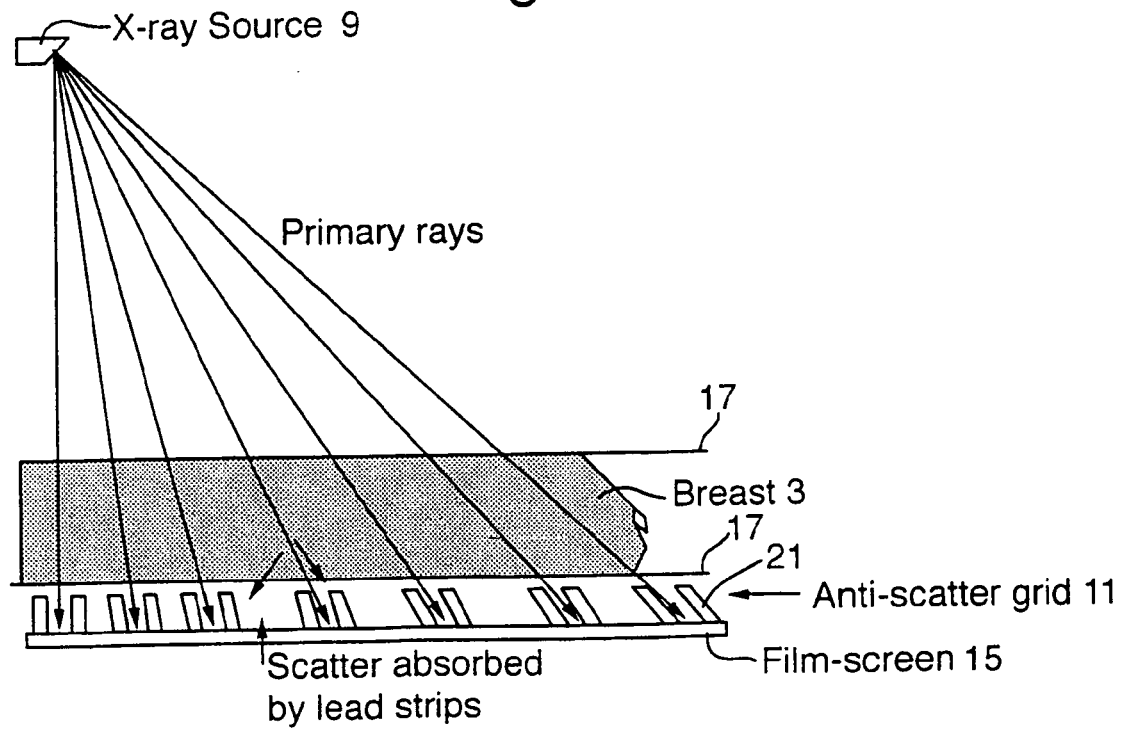
FIG. 2 is a schematic view of a typical anti-scatter grid.
Figure 3:
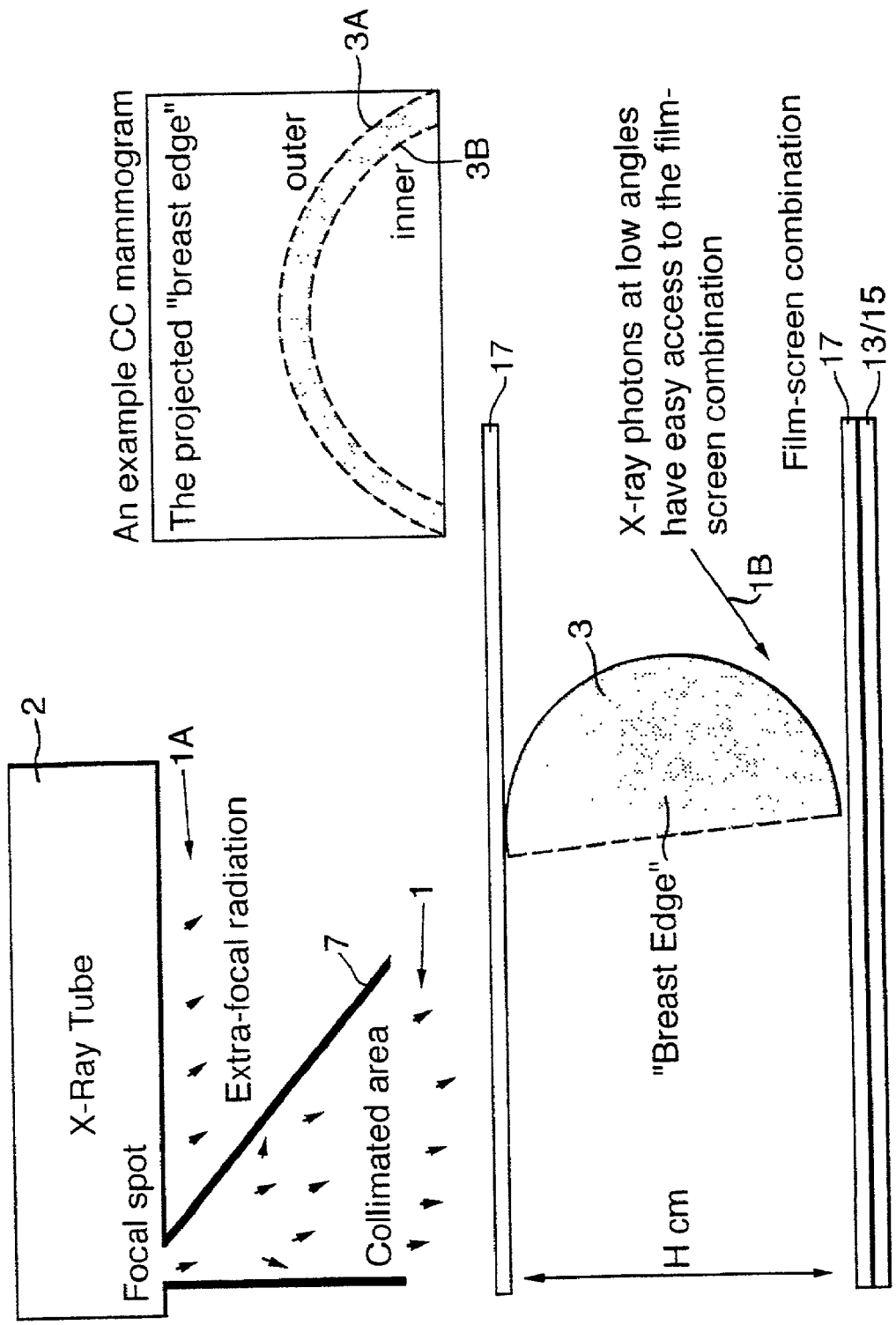
FIG. 3 is a schematic view of a collimator showing the path of extra-focal radiation.
Figure 4:
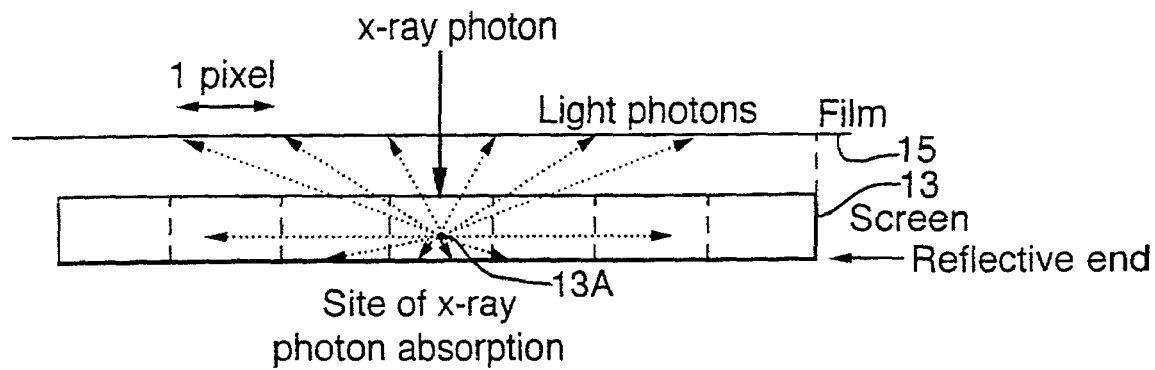
FIG. 4 is a schematic view of an intensifying screen and film.

As mentioned above the curve C used is the "inner projected breast edge". This is the breast tissue around the edge of the compressed breast which is fat and which is where the breast starts to curve, FIG. 3 shows this pictorially. In FIG. 3 it can be seen that most x-ray radiation comes from the focal spot. However, some extra-focal radiation is scattered so that it reaches the film-screen and contributes to the final image. Since the breast edge is curved, photons 1B arriving at low angles have easy access to the film-screen and thus have a significant impact on the final image. In the following the breast edge is defined to be that volume of the breast which is fat and is where the breast thickness descends from H towards zero. On a mammogram this area can be depicted by an inner and outer curve 3A and 3B as shown in the top-right of FIG. 3 and these can be calculated using the techniques described above for the calculation of H.

The inner curve is used as curve C and the breast edge is modelled as consisting entirely of fat and being semi-circular. Using this assumption, the thickness of tissue between any point and where the extra-focal is perceived to be coming from can be computed and then this is used to adjust the extra-focal estimate accordingly.

FIG. 22 shows the coordinate system used. (X, Y, Z) are used as the 3D coordinates of a point, with the X axis along the chest wall, the Z axis perpendicular to the chest wall, and Y the vertical axis towards the x-ray source. (x, z) is a point in the 2D image plane. When no breast is present the film-screen combination at (x, z) is assumed to receive the same extra-focal radiation from all directions (θ, ρ). ρ is termed the azimuthal angle, θ the elevation angle and $E^{imp}_{extra}$ is the "extra-focal constant", that is, the energy incident on (x, z) from any direction.

The energy imparted to the screen due to extra-focal radiation can be assumed to be constant across the image if there were no breast present. With the breast present, the extra-focal radiation is attenuated by that quantity of breast tissue present along any particular path of travel.

That quantity of breast tissue is estimated using a model of the breast edge and the constant $E^{imp}_{extra}$ that would have been imparted had no breast been present is computed.

At each pixel (x, z), the energy imparted when a grid is used can be approximated by:

$$\forall \theta:0-\pi, \rho:0-2\pi E_e^{imp}(x, z, \theta, \rho)=E_{extra}^{imp}T(\theta, \rho),$$

where T is the transmission through the anti-scatter grid, and assuming that the screen absorbs all the photons reaching it, regardless of angle. To simplify the analysis a monoenergetic case with photon energy ε is treated. The total extra-focal radiation imparted to the intensifying screen at any point when no object is present is given by:

$$E_e^{imp}(x, z) = \int_0^{2\pi} \int_0^{\pi} E_e^{imp}(x, y, \theta) d\theta d\rho = E_{extra}^{imp} \int_0^{2\pi} \int_0^{\pi} T(\theta, \rho) d\theta d\rho$$

Let $\mu h(x, z, \theta, \rho)$ be the attenuation due to the breast along the path to point (x, z) from angles: θ, ρ:

$$\mu h(x, z, \theta, \rho)=h_{int}(x, z, \theta, \rho)\mu_{int}(\epsilon)+h_{fat}(x, z, \theta, \rho)\mu_{fat}(\epsilon)$$

with ε the relevant photon energy. The energy imparted due to extra-focal radiation can be estimated using Beer's Law, ignoring scatter, for when the breast is present:

$$E_e^{imp}(x, z) = E_{extra}^{imp} \int_0^{2\pi} \int_0^{\pi} e^{-\mu h(x,z,\theta,\rho)} T(\theta, \rho) d\theta d\rho$$

To study the problem analytically, this equation must be simplified. This is done by first assuming symmetry around the azimuthal angle ρ so that the problem becomes essentially one dimensional:

$$E_e^{imp}(x, z) = 2\pi E_{extra}^{imp} \int_0^{\pi} e^{-\mu h(x,z,\theta)} T(\theta) d\theta$$

$E^{imp}_{extra}$ is estimated together with the attenuation along each ray using a suitable model of the breast and breast shape as explained below. The problem can be reduced further since $\pi/2 < \theta < \pi$ represents the angles of extra-focal radiation coming from the chest wall where there is a full thickness of breast and body, so that contribution is assumed to be minimal. Furthermore, the most important part of the breast for extra-focal radiation is the breast edge and that can be considered to be just fat, so that the equation can be further simplified:

$$E_e^{imp}(x, z) = 2\pi E_{extra}^{imp} \int_0^{\frac{\pi}{2}} e^{-\mu_{fat} h_{fat}(x,z,\theta)} T(\theta) d\theta, \quad (7)$$

Figure 23:
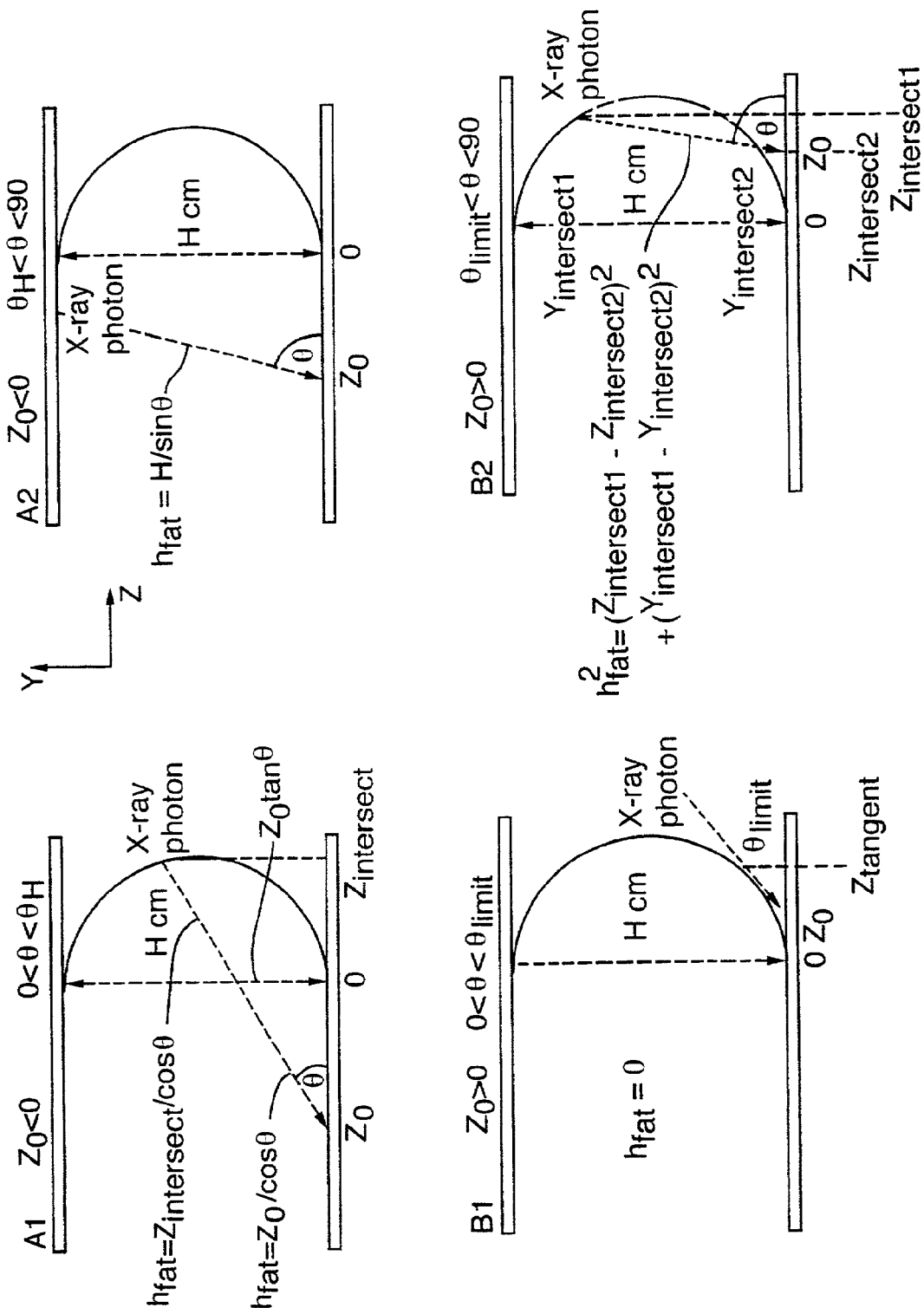
FIG. 23 illustrates the thickness of breast tissue through which extra-focal radiation travels.

In this equation $h_{fat}(x, z, \theta)$, i.e. the thickness of fat from any point along any direction, is computed as explained below. Using the coordinate system of FIG. 22 the shape of the breast edge is considered to be semi-circular. With no loss of generality save for assumptions of rotational symmetry about the azimuth, the 1D case where X=0 and Z is perpendicular to the chest-wall is treated, so that the breast edge can be described by:

$$Y(Z_0) = a \pm \sqrt{(a^2 - Z_0^2)},$$

where a=H/2 and $Z_0$ is the Z-coordinate relative to the edge of the inner breast edge, i.e. $Z_0 = Z - Z_{edge}$. FIG. 23 shows the two cases inside the breast. The case A1 shows the ray travelling through both breast and breast edge: for angles of $0 < \theta < \theta_H$ where $\theta_H = \tan^{-1} H/|Z_0|$ the extra-focal rays must travel through a thickness of breast tissue and a thickness of breast edge tissue so that:

$$h_{fat}(\theta) = \frac{Z_0}{\cos\theta} + \frac{Z_{intersect}}{\cos\theta}$$

and $Z_{intersect}$ is the intersection of the ray and the breast edge which occurs at:

$$Z_{intersect} = \frac{m(a-c) \pm \sqrt{(m^2 a^2 - c^2 + 2ac)}}{1 + m^2}$$

where m=tan θ and c=$Z_0$ tan θ. For the points which satisfy case A2, some of the extra-focal rays will come through tissue which is within the uniform breast thickness and some through the breast edge area. These rays are from $\theta_H$ to $\pi/2$ and the thickness of the breast is simply: $h_{fat}(\theta) = H/\sin\theta$. Outside the $h_{int}=0$ line, there are angles that have a free line-of-sight to the pixel (x, z), see case B1 in FIG. 23. In fact, these angles are from 0 to $\theta_{limit}$ where $\theta_{limit}$ is the angle of the tangent to the breast curve which passes through the pixel. The tangent to the bottom half of the breast which passes through the point ($Z_0$, 0) that is required passes through the point.

$$Z_{tangent} = \frac{2a^2 Z_0}{Z_0^2 + a^2}$$

and thus:

$$\theta_{limit} = \tan^{-1} \frac{Z_{tangent}}{\sqrt{(a^2 - Z_{tangent}^2)}}$$

So, that for $0 < \theta < \theta_{limit}$; $h_{fat}(\theta) = 0$. Case B2 in FIG. 23 reveals that for some of the angles of interest the x-ray path is purely through the breast edge. Now the two intersection points of the ray with the breast edge semi-circle are needed, i.e. ($Z_{intersect\ 1}$, $Y_{intersect\ 1}$) and $Z_{intersect\ 2}$, $Y_{intersect\ 2}$).

The two Z coordinates are given by:

$$Z_{intersect} = \frac{m(a-c) \pm \sqrt{(m^2 a^2 - c^2 + 2ac)}}{1 + m^2}$$

with m=tan θ, a=H/2 and c=−tan $\theta Z_0$. And thus:

$$h_{fat}(\theta) = \sqrt{(Z_{intersect1} - Z_{intersect2})^2 + (Y_{intersect1} - Y_{intersect2})^2}$$

Using these thicknesses the basis extra-focal equation (7) can be rewritten as:

$$E_e^{imp}(x, z) = 2\pi E_{extra}^{imp} \int_0^{\pi/2} e^{-\mu_{fat} h_{fat}(x,z,\theta)} T(\theta) d\theta = \quad (8)$$

$$2\pi E_{extra}^{imp} \left( \int_0^{\theta_{limit}} T(\theta) d\theta + \int_0^{\pi/2} e^{-\mu_{fat} h_{fat}(x,z,\theta)} T(\theta) d\theta \right),$$

where $\theta_{limit}$ is the angle of the tangent to the breast edge curve and for cases A1 and A2 is zero.

In order to finally compute the extra-focal radiation from equation (8) it is necessary to estimate the constant $E^{imp}_{extra}$. The location of the projected breast edge is assumed and since the breast is assumed to be all fat the location of a curve which has $h_{int}=0$ and $h_{fat}=H$ (the inner curve in FIG. 3). Thus the primary and scatter components along the curve can be estimated and by subtracting those values away from the total energy the extra-focal component along the curve can be found. Knowing just one value for the extra-focal component allows computation of the constant $E^{imp}_{extra}$ as follows:

Let the curve with $h_{int}=0$ and $h_{fat}=H$ be $C_{hint=0}$. Since the location of that curve is known from the breast edge an estimate of the extra-focal component there is:

$$\forall (x, z) \in C_{h_{int}=0} \cdot E_e^{imp}(x, z) = E_{pse}^{imp}(x, z) - E_s^{imp}(x, z) - E_p^{imp}(x, z)$$

The scatter estimate comes from step (7) of the method, $E^{imp}_{pse}$ comes from the image and $E^{imp}_p$ comes from knowing that $h_{int}=0$ and $h_{fat}=H$. The average of $E^{imp}_e$ along the $C_{hint=0}$ curve and Equation (8) with $\theta_{limit}=0$ to determine the constant:

$$E_{extra}^{imp} = \frac{\overline{E_e^{imp}(C_{h_{int}=0})}}{2\pi \int_0^{\pi/2} e^{-\mu_{fat} h_{fat}(x,z,\theta)} T(\theta) d\theta}$$

Thus the extra-focal component and the percentage of the total radiation that is extra-focal can be computed. FIG. 24 shows two examples of the extra-focal component computed in this way. They show that, as expected, the extra-focal radiation is high at the breast edge but falls rapidly inside the breast falling to zero if the breast is large enough.

Incorporating all the assumptions above in examples, the percentages computed indicate that extra-focal radiation is of the order of 6-10% of the total radiation. This is on the low side of the estimate made in other ways which state that extra-focal component can make up to 15% of the total radiation, but is thought to be reasonable.

Calculation of $h_{int}$

Figure 5:
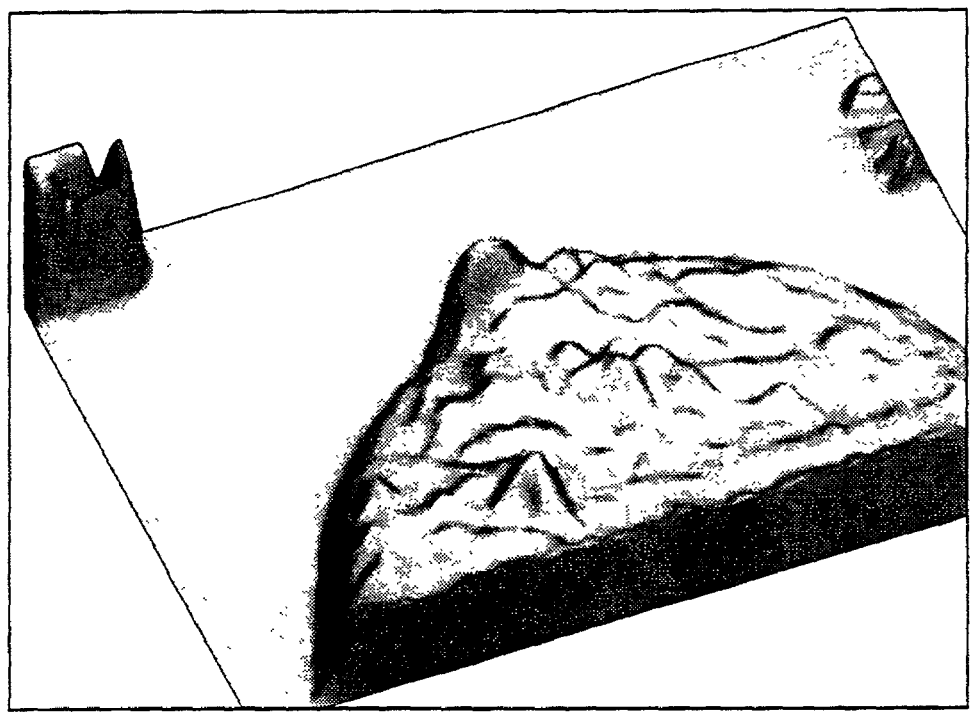
FIG. 5 shows an $h_{int}$ surface of a mammogram.

The $h_{int}$ representation can now be found by applying steps (9) and (10) to produce $h_{int}$ surfaces such as that shown in FIG. 5. In practice, steps (6) to (10) are used to calculate a first value of $h_{int}$ and then these steps are repeated with improved assumptions about the breast thickness H until the best value of $h_{int}$ is found.

We claim:

1. In a method of x-ray imaging using an intensifying screen to receive x-rays and emit light to be recorded on an x-ray film, a method of calculating from a film image density an energy which was imparted to the intensifying screen, comprising steps of:
    calibrating the film and intensifying screen by measuring a response of the film and intensifying screen to a plurality of different intensities of received x-rays;
    fitting a theoretical model of an expected response to the measured response, and using the fitted theoretical model to calculate the imparted energy from image density,
    wherein the theoretical model is a serpentine curve of the form:

$$x^2y+a^2y-b^2x=0,$$

where a and b are constants, x is a logarithm of the energy imparted to the intensifying screen and y is the image density.

2. In a method of x-ray imaging using an intensifying screen to receive x-rays and emit light to be recorded on an x-ray film, a method of calculating from a film image density an energy which was imparted to the intensifying screen, comprising steps of:
    calibrating the film and intensifying screen by measuring a response of the film and intensifying screen to a plurality of different intensities of received x-rays;
    fitting a theoretical model of an expected response to the measured response, and using the fitted theoretical model to calculate the imparted energy from image density,
    wherein the response of the film and intensifying screen to a plurality of different intensities of received x-rays is measured by exposing the film-screen combination to x-rays through a lucite step wedge and measuring image density produced by the exposing through different steps of the wedge.

3. Apparatus for calculating from image densities of an x-ray film image the energy which was imparted to an intensifying screen used to receive x-rays and emit light to be recorded on the x-ray film, the apparatus comprising:
    fitting means for fitting a theoretical model of the expected response to the x-ray film and intensifying screen to a plurality of different intensities of received x-rays to a measured response, and
    calculation means for using the fitted theoretical model to calculate the imparted energy from image density,
    wherein the theoretical model is a serpentine curve of the form:

$$x^2y+a^2y-b^2x=0,$$

where a and b are constants, x is a logarithm of the energy imparted to the intensifying screen and y is the image density.

4. A computer program storage medium readable by a computer system and encoded with a computer program for controlling a computer to calculate from image densities of an x-ray film the energy which was imparted to an intensifying screen used to receive x-rays and emit light recorded on the x-ray film, by a method comprising steps of:
    fitting a theoretical model of an expected response of the x-ray film and intensifying screen to a plurality of different intensities of received x-rays to a measured response, and using the fitted theoretical model to calculate the imparted energy from image density,
    wherein the theoretical model is a serpentine curve of the form:

$$x^2y+a^2y-b^2x=0,$$

where a and b are constants, x is a logarithm of the energy imparted to the intensifying screen and y is the image density.

5. A method of calculating from a mammogram a compressed thickness of an imaged breast, comprising a step of delimiting in the mammogram a region corresponding to a part of the breast which is compressed from a region corresponding to an uncompressed breast edge by detecting smoothness of curves of equal intensity in the mammogram.

6. A method according to claim 5, further comprising steps of detecting a smooth equal intensity curve which is positioned furthest from the breast edge, calculating from intensities along that curve a thickness of fat in the breast which gives those intensities, and calculating the thickness of the compressed breast from that thickness of fat.

7. A method according to claim 5, comprising as an initial step a conversion of the mammogram into an $h_{int}$ representation representing thicknesses of fat and interesting tissue in regions of the breast contributing to each point in the mammogram.

8. A method according to claim 7, wherein the conversion is performed on the basis of an underestimate of the compressed breast thickness, the conversion being iterated with successively changing estimates of the compressed breast thickness until a smooth delimitation between the region corresponding to the part of the breast which is compressed and the region corresponding to the uncompressed breast edge is found.

9. A method according to claim 5, wherein a predefined smoothness threshold is set to detect smooth curves.

10. A method of calculating a contribution to a mammogram of extra-focal radiation by calculating the compressed thickness of the imaged breast according to the method of claim 5, calculating from an x-ray exposure and an estimate of scattering of radiation an expected intensity in the mammogram along the delimitation between the region corresponding to the part of the breast which is compressed and the region corresponding to the uncompressed breast edge, and comparing the expected intensity to an actual intensity in the mammogram.

11. A computer program storage medium readable by a computer system and encoded with a computer program for controlling a computer to calculate a contribution to a mammogram of extra-focal radiation by calculating the compressed thickness of the imaged breast according to the method of claim 5, calculating from an x-ray exposure and an estimate of scattering of radiation an expected intensity in the mammogram along the delimitation between the region corresponding to the part of the breast which is compressed and the region corresponding to the uncompressed breast edge, and comparing the expected intensity to an actual intensity in the mammogram.

12. Apparatus for calculating from a mammogram a compressed thickness of an imaged breast, comprising a display for displaying a mammogram and means for delimiting in the mammogram a region corresponding to a part of the breast which is compressed from a region corresponding to an uncompressed breast edge by detecting smoothness of curves of equal intensity in the mammogram.

13. Apparatus according to claim 12, further comprising detection means for detecting a smooth equal intensity curve which is positioned furthest from the breast edge, and calculating means for calculating from intensities along that curve a thickness of fat in the breast which gives those intensities, and for calculating the thickness of the compressed breast from that thickness of fat.

14. Apparatus according to claim 12, further comprising conversion means for converting the mammogram into an $h_{int}$ representation representing thicknesses of fat and interesting tissue in regions of the breast contributing to each point in the mammogram.

15. Apparatus according to claim 14, wherein the conversion means first underestimates the compressed breast thickness, and iterates the conversion with successively changing estimates of the compressed breast thickness until a smooth delimitation between the region corresponding to the part of the breast which is compressed and the region corresponding to the uncompressed breast edge is found.

16. Apparatus according to claim 12, wherein a predefined smoothness threshold is set to detect smooth curves.

17. Apparatus for calculating a contribution to a mammogram of extra-focal radiation comprising apparatus according to claim 12 for calculating the compressed thickness of the imaged breast, and further comprising expected intensity calculating means for calculating from an x-ray exposure and an estimate of scattering of radiation an expected intensity in the mammogram along the delimitation between the region corresponding to the part of the breast which is compressed and the region corresponding to the uncompressed breast edge, and comparing means for comparing the expected intensity to an actual intensity in the mammogram.

18. A computer program storage medium readable by a computer system and encoded with a computer program for controlling a computer to calculate from a mammogram a compressed thickness of an imaged breast by a method comprising a step of delimiting in the mammogram a region corresponding to a part of the breast which is compressed from a region corresponding to an uncompressed breast edge by detecting smoothness of curves of equal intensity in the mammogram.

19. A computer program storage medium according to claim 18, wherein the method further comprises steps of detecting a smooth equal intensity curve which is positioned furthest from the breast edge, calculating from intensities along that curve a thickness of fat in the breast which gives those intensities, and calculating the thickness of the compressed breast from that thickness of fat.

20. A computer program storage medium according to claim 18, wherein the method further comprises as an initial step a conversion of the mammogram into an $h_{int}$ representation representing thicknesses of fat and interesting tissue in regions of the breast contributing to each point in the mammogram.

21. A computer program storage medium according to claim 20, wherein the conversion is performed on the basis of an underestimate of the compressed breast thickness, the conversion being iterated with successively changing estimates of the compressed breast thickness until a smooth delimitation between the region corresponding to the part of the breast which is compressed and the region corresponding to the uncompressed breast edge is found.

22. A computer program storage medium according to claim 18, wherein a predefined smoothness threshold is set to detect smooth curves.

23. Apparatus for calculating from image densities of an x-ray film image the energy which was imparted to an intensifying screen used to receive x-rays and emit light to be recorded on the x-ray film, the apparatus comprising a processor controlled in accordance with a control program to fit a theoretical model of the expected response of the x-ray film and intensifying screen to a plurality of different intensities of received x-rays to a measured response, and to use the fitted theoretical model to calculate the imparted energy from image density, wherein the theoretical model is a serpentine curve of the form:

$$x^2y+a^2y-b^2x=0,$$

where a and b are constants, x is a logarithm of the energy imparted to the intensifying screen and y is the image density.

24. Apparatus for calculating from a mammogram a compressed thickness of an imaged breast, the apparatus comprising a processor controlled in accordance with a control program to delimit in the mammogram a region corresponding to a part of the breast which is compressed from a region corresponding to an uncompressed breast edge by detecting smoothness of curves of equal intensity in the mammogram.

* * * * *